US011922280B2

(12) United States Patent
Wenchel et al.

(10) Patent No.: US 11,922,280 B2
(45) Date of Patent: Mar. 5, 2024

(54) MACHINE LEARNING MONITORING SYSTEMS AND METHODS

(71) Applicant: Arthur AI, Inc., New York, NY (US)

(72) Inventors: Adam Wenchel, Washington, DC (US); John Dickerson, Washington, DC (US); Priscilla Alexander, Washington, DC (US); Elizabeth O'Sullivan, Brooklyn, NY (US); Keegan Hines, Washington, DC (US)

(73) Assignee: Arthur AI, Inc., New York, NY (US)

( * ) Notice: Subject to any disclaimer, the term of this patent is extended or adjusted under 35 U.S.C. 154(b) by 189 days.

(21) Appl. No.: 17/116,615

(22) Filed: Dec. 9, 2020

(65) Prior Publication Data

US 2021/0174258 A1 Jun. 10, 2021

Related U.S. Application Data

(60) Provisional application No. 62/946,094, filed on Dec. 10, 2019.

(51) Int. Cl.
*G06N 20/00* (2019.01)
(52) U.S. Cl.
CPC .................. *G06N 20/00* (2019.01)
(58) Field of Classification Search
None
See application file for complete search history.

(56) References Cited

U.S. PATENT DOCUMENTS

| 2013/0031034 | A1* | 1/2013 | Gubin | G06Q 50/01 |
| | | | | 706/12 |
| 2016/0071027 | A1* | 3/2016 | Brand | H04L 45/08 |
| | | | | 706/12 |
| 2019/0102361 | A1 | 4/2019 | Muralidharan et al. | |
| 2020/0151619 | A1* | 5/2020 | Mopur | G06N 20/00 |
| 2020/0211021 | A1* | 7/2020 | Allbright | G06N 20/00 |

FOREIGN PATENT DOCUMENTS

WO    WO-2021119087 A1    6/2021

OTHER PUBLICATIONS

Demsar, J. et al., "Detecting concept drift in data streams using model explanation," Expert Systems with Applications, vol. 92 (2018) pp. 546-559. (Year: 2018).*

(Continued)

*Primary Examiner* — Brian M Smith
(74) *Attorney, Agent, or Firm* — COOLEY LLP

(57) ABSTRACT

A method for monitoring performance of a ML system includes receiving a data stream via a processor and generating a first plurality of metrics based on the data stream. The processor also generates input data based on the data stream, and sends the input data to a machine learning (ML) model for generation of intermediate output and model output based on the input data. The processor also generates a second plurality of metrics based on the intermediate output, and a third plurality of metrics based on the model output. An alert is generated based on at least one of the first plurality of metrics, the second plurality of metrics, or the third plurality of metrics, and a signal representing the alert is sent for display to a user via an interface.

19 Claims, 17 Drawing Sheets

(56) References Cited

OTHER PUBLICATIONS

Gao, W. et al., "Face gender classification on consumer images in a multi-ethnic environment," 2009 Intl. Conf. on Biometrics (2009) pp. 169-178. (Year: 2009).*
Lazarescu, M. M. et al, "Using multiple windows to track concept drift," Intelligent Data Analysis vol. 8, No. 1 (2004) pp. 29-59. (Year: 2004).*
Minku, L. et al., "DDD: a new ensemble approach for dealing with concept drift," IEEE Trans. on Knowledge and Data Engineering, vol. 24, No. 4 (Apr. 2012) pp. 619-633. (Year: 2012).*
Ren, S. et al., "Knowledge-maximized ensemble algorithm for different types of concept drift," Information Sciences vol. 430-431 (2018) pp. 261-281. (Year: 2018).*
Ribeiro, M.T. et al., "Why should I trust you?' explaining the predictions of any classifier," downloaded from <https://arxiv.org/abs/1602.04938> (Aug. 9, 2016) 10 pp. (Year: 2016).*
Yu, S. et al., "Request-and-reverify: hierarchical hypothesis testing for concept drift with expensive labels," downloaded from <https:/arxiv.org/abs/1806.10131> (Jun. 28, 2018) 7 pp. (Year: 2018).*
Ahn, Y. et al., "FairSight: Visual Analytics for Fairness in Decision Making," arXiv:1908.00176v2 [cs.HC], Dec. 2, 2019, 10 pages.
International Search Report and Written Opinion for International Application No. PCT/US2020/063944, dated Mar. 18, 2021, 13 pages.

Zhang, Y. et al., "Three-layer concept drifting detection in text data streams," Neurocomputing, vol. 260 (May 2017), pp. 393-403.
Kim, B. et al., "Examples are not enough, learn to criticize! Criticism for interpretability," 30th Conference on Neural Information Processing Systems (NIPS 2016), Barcelona, Spain (2016), 9 pages.
Lundberg, S. M. et al., "A Unified Approach to Interpreting Model Predictions," 31st Conference on Neural Information Processing Systems (NIPS 2017), Long Beach, CA, USA, (2017), 11 pages.
Shilton, A. et al., "Regret bounds for transfer learning in bayesian optimisation," Proceedings of the 20th International Conference on Artificial Intelligence and Statistics (AISTATS) 2017, Fort Lauderdale, FL, USA, Proceedings of Machine Learning Research, vol. 54, pp. 307-315 (2017).
Strumbelj, E. et al., "Explaining prediction models and individual predictions with feature contributions," Knowledge and Information Systems, vol. 41, pp. 647-665 (2014).
Strumbelj, F. et al., "An efficient explanation of individual classifications using game theory," Journal of Machine Learning Research, vol. 11 (2010), pp. 1-18.
Taylor, S. J. et al., "Forecasting at scale," The American Statistician, vol. 72, No. 1, pp. 37-45 (2018).
Wang, F. et al., "Falling Rule Lists," Artificial Intelligence and Statistics (2015), 10 pages.

* cited by examiner

MACHINE LEARNING MONITORING SYSTEMS AND METHODS

CROSS-REFERENCE TO RELATED APPLICATIONS

This application claims priority to and the benefit of U.S. Provisional Patent Application No. 62/946,094, titled "Machine Learning Health Monitoring Systems and Methods," filed Dec. 10, 2019, the disclosure of which is hereby incorporated by reference in its entirety.

TECHNICAL FIELD

The present disclosure relates generally to computer networks and, more specifically, to methods and systems for monitoring and modifying the performance of machine learning systems with explainable artificial intelligence models.

BACKGROUND

Computer systems that rely on statistical models built on sample data, also referred to as machine learning (ML) models, are ubiquitous. ML models can be used to find patterns in data, make predictions about what data from the same data stream or from different data streams will look like in the future, and make real-time decisions.

SUMMARY

In some embodiments, a method for monitoring performance of a ML system includes receiving a data stream via a processor and generating a first plurality of metrics based on the data stream. The processor also generates input data based on the data stream, and sends the input data to a machine learning (ML) model for generation of intermediate output and model output based on the input data. The processor also generates a second plurality of metrics based on the intermediate output, and a third plurality of metrics based on the model output. An alert is generated based on at least one of the first plurality of metrics, the second plurality of metrics, or the third plurality of metrics, and a signal representing the alert is sent for display to a user via an interface.

DETAILED DESCRIPTION

Figure 1:
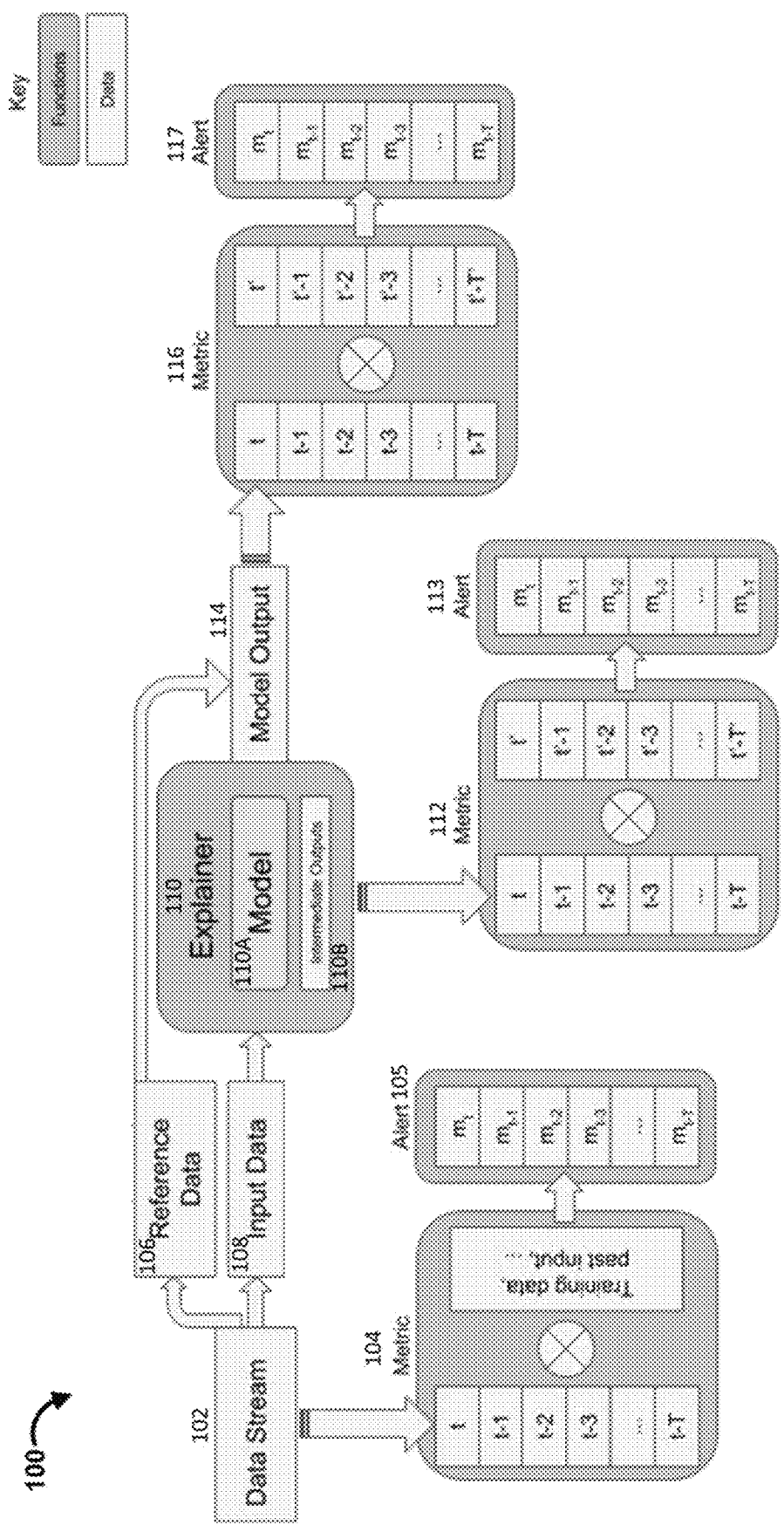
FIG. 1 is a diagram of an example machine learning monitoring system, including measurement, metrics, explanation, and alert subsystems, according to some embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

Tradeoffs exist between the complexity of known ML models (e.g., measured via number of parameters, number of features, precision level of storage, etc.), the human interpretability of the models, the amount of data used to initialize or "train" the ML models, and the time taken to train each ML model. Making matters more complex, the sample data used to train a ML model may change over time, or be sampled from a true distribution in a statistically biased way that might impact the performance (e.g., overall accuracy, inference speed, accuracy with regard to a specific subgroup in the data) of the ML model. Standard heuristics for adjusting ML-based systems to changes in data distributions or use cases over time include letting ML models fail early during a burn-in period, retraining the ML models manually at an ad-hoc, pre-set pace or frequency (e.g., "retrain every night after close of business"), or fully retiring ML models at an ad-hoc, pre-set pace or frequency (e.g., "retire a ML model after the fiscal year closes").

Some embodiments described herein provide a holistic method for proactively monitoring and measuring the overall health of a ML-based computer system, as well as a method for addressing the foregoing ML system health concerns in a semi-automated or fully-automated fashion. Such methods may include measurement and human-interpretable display of the health and performance of the ML-based computer systems, as well as semi-automated methods and automated methods for addressing health and performance issues in live ML-based computer systems. The methods can take into account combinations of data within the ML system (including one or more of: raw data, processed data, data explicitly used for training ML models, data explicitly used for testing ML models, and live data being run through ML models), as well as the live ML model or models of the ML-based computer systems.

For example, some methods described herein can include ingesting, in real-time, one or more health metrics relating to a ML model or models (e.g., overall accuracy, relative accuracy across various subgroups of an input dataset, inference speed, classification rates, distribution of outputs from a regression-based model, etc.). Alternatively or in addition, one or more embodiments of the methods set forth herein can include ingesting, in real-time, one or more statistics and/or health metrics relating to or associated with the underlying data (e.g., drift in mean or variance, changes in velocity, changes in missing values, etc.). In some embodiments, both underlying data and the health and/or other statistical metrics run on that data are used to compute the impact of each feature in the underlying data on the health and performance of one or more ML models, filtered over time.

By sampling some or all of the data within the ML system (i.e., raw input data, health metrics, model outputs, metrics run on the model outputs, and other statistical metrics) over time, some embodiments may compute one or more aggregate health scores for the ML model, the data, and/or the full ML-based system. In some such embodiments, the aggregate health score(s) can be used to trigger one or more actions including, but not limited to: generating and sending an alert to one or more users of the ML system, automatically retraining one or more ML models, disabling one or more ML models, taking one or more ML models out of production/operation (e.g., from one or more processors), re-sampling training data to address one or more identified problem areas). In some embodiments, users can modify (e.g., via an interface such as a graphical user interface ("GUI") of a computer display) the values of input data to explore the weight(s) of factors that played a role in a client ML model's decision. As values are adjusted in the interface, the interface may display the weights of the importance of each feature, along with a new simulated decision generated based on the user-adjusted values.

Underlying data can be accessible to, or influence, the performance of a ML model or set of ML models. For example, the data used to train ML models ("training data") may be sampled, possibly via a noisy process, from some underlying and potentially opaque true data distribution or source. That sampling process can itself be biased (e.g., the distribution over types of observations in the sample may not match that in the underlying true distribution), noisy (e.g., for a particular observation, the sampled value for a particular feature may not match the true value for that feature), incomplete (e.g., a mechanism may censor particular values randomly or adversarially), and/or out of date (e.g., if the true data distribution changes over time, the sampled data may become stale). ML models trained on sampled data with any one or more of these issues will generate predictions or decisions that are impacted by those issues. If affected model performance is detected (e.g., if the accuracy of a static ML model has degraded over time), then an underlying issue in the sample data may be inferred (e.g., the true distribution has changed since training), and an action can be automatically triggered, in response to the detection, at either or both of the data level and the ML model level (e.g., retrain the model, re-sample at least a portion or subset of the data, etc.). In this way, the ML models and the data can be dynamically linked.

In some embodiments, data can be measured during training and during inference generation by a software "agent" component that is configured to gather statistics and send/transmit them to an interface (e.g., for display via a GUI). The agent component can include software code stored in a memory of a compute device that is the same as, collocated with, or remote from the compute device on which the inference generation is performed (e.g., on a remote server).

Many performance metrics for ML models can be measured automatically. For example, in the context of a simple binary classification model, define on some test dataset the following four counts: true positive ("TP") count, defined as the number of test data points having both a true positive label (or "class label") and a model-predicted positive label; true negative ("TN") count, defined as the number of test data points having both a true false label and a model-predicted false label; false positive ("FP") count, defined as the number of test data points having a true negative label but a model-predicted positive label; and false negative ("FN") count, defined as the number of test data points having a true positive label but a model-predicted false label. In such a scenario, some of the automatically tracked metrics may include:

Accuracy: the fraction of predictions made by the ML model (a binary classifier, in this case) that are correct. Formally: $(TP+TN)/(TP+FP+TN+FN)$;

True positive rate, sensitivity, or recall: the fraction of true positives that are correctly predicted by the ML model to be positive. Formally: $TP/(TP+FN)$;

False positive rate: the fraction of true negatives that are incorrectly predicted to be positive. Formally: $FP/(FP+TN)$;

True negative rate or specificity: the fraction of true negatives that are correctly predicted to be negative. Formally: 1—the false positive rate, defined above.

False negative rate: the fraction of true positives that are incorrectly predicted to be negative. Formally: 1—the true positive rate, defined above.

Precision (specific to binary classification, or one-vs-many classification): the fraction of true positives amongst all model-labeled positives. Formally, $TP/(TP+FP)$.

F-measures, such as the $F_1$ score: the harmonic mean of precision and recall (aka true positive rate), both defined above.

Similarly, in the context of a simple regression model, various loss metrics may be measured, such as:

Mean absolute error: the average absolute difference between a predicted value and the true value, across some set of data (e.g., test data);

Mean squared error: the average squared difference between a predicted value and the true value, across some set of data;

Root mean squared error: the square root of the mean squared error, defined above.

The foregoing list is not exhaustive, and the metrics listed above are intended to be representative of some subset of the metrics that could be used. Metrics can be measured over all inferences, or over subsets of inferences relative to a particular partitioning of the data (e.g., sliced by time, or sliced by sub-groups based on particular feature values). When measured over subsets of the data, comparative metrics such as fairness and bias of the trained ML model on the sample or true data can also be defined and measured automatically. For example, suppose that a ML model is trained on a dataset that can be partitioned based on a predetermined set of sub-groups A, B, C, and D. Then:

One measure of a model's unfairness could be computed as the difference between the sub-group of data having the highest accuracy and the sub-group of data having the lowest accuracy (for example, sub-groups A and C, with respective accuracies $a_A$ and $a_C$). Unfairness "scores" that are closer to zero may be deemed more fair, and unfairness scores that are further from zero may be deemed less fair.

Another measure—in this case specific to classification problems—can penalize differences across sub-groups of classification of a particular label, a.k.a. "group fairness." Specifically, for a given label X, the measure could return the maximum difference across any pair of sub-groups of elements within that sub-group being labeled as X.

The performance metrics described herein are presented by way of example, however, other performance metrics can also be generated, tracked, and used by the embodiments set forth herein. ML model performance metrics, in particular, can be referred to as individual model-level performance metrics. When referring to analogous metrics that include or are based on individual model-level performance metrics aggregated across multiple ML models, such metrics can be referred to as aggregate model-level performance metrics.

In some embodiments, a system facilitates the onboarding and subsequent tracking of one ML model or a set of ML models that have been trained outside of the system. For each ML model that is tracked, input data may stream through the ML model sequentially, and the system may store (e.g., depending on hard-wired, pre-programmed, or user-defined settings) the raw input data and/or aggregate statistics about the raw input data, as well as the output from the ML model when executed on that raw input data. In some embodiments, the system computes sets of both individual model-level performance metrics and aggregate model-level performance metrics in real-time, and store (e.g., in common or co-located memory locations, common database records, common table entries, etc.) those metrics alongside the input data and its inferences, along with a timestamp. Example systems of the present disclosure are described below, with reference to FIGS. 1 and 7, below.

In one or more embodiments, metrics associated with live data, sample data, training data, and/or true underlying data distributions that are relevant to the performance of ML models trained and evaluated on that data may be measured automatically. Examples include, for live data alone, tracking the change iteratively, in various moments, parameters, or other measures over time such as:
- mean, median, mode;
- variance and other measures of spread, such as the range (i.e., minimum and maximum value), median absolute deviation of the sample;
- skew.

The following is an example of how to explicitly compute one such metric. Consider an arbitrary window of time "T" having a duration of 60 seconds. One metric applicable to a single-dimensional regression problem can be the change in the mean value of the most recent 60 seconds' (time T) worth of outputs from a ML model, compared to the mean value of the penultimate (or second most recent) 60 seconds' (time T−1) worth of data. For multidimensional regression, an applicable metric (e.g., distance metric) can be any valid metric comparing the average of multiple outputs at time T to the average of multiple outputs at time T−1. Similarly, instead of relying on a time window, the ML model can also incorporate a window of a number of inferences, e.g., comparing the most recent window of 100 outputs to the window of 100 outputs immediately preceding the most recent window.

FIG. 1 is a diagram of an example machine learning monitoring system, including measurement, metrics, explanation, and alert subsystems, according to some embodiments. As shown in FIG. 1, the system 100 includes an explainable artificial intelligence (XAI) module or engine ("explainer") 110, which may be implemented in software and/or hardware (e.g., one or more processors), and which is configured to analyze ML model inferences and provide model outputs 114 (e.g., to one or more users, in a manner that is interpretable by the one or more users). The model outputs 114 can include explanations of the ML model inferences. The explanations can be based on the metrics at any phase of the system (pre, during, and/or post model inference). The explanations can be stored with such metrics, for example in common records of a database or other storage medium. Such explanations can include indications of data features and their associated feature importance. In addition, metrics can be generated based on the explanations. Such metrics can include, for example, metrics based on feature importance over time (e.g., "the average importance of feature 2 has increased for the last six time periods," or similar) The explainer 110 includes a ML model 110A and, during operation, generates intermediate outputs 110B based on the provided inputs (reference data 106 and input data 108, discussed below).

During operation of the system 100, an input data stream 102 is received, which may include one or more inferences generated by one or more ML models (not shown). The input data stream 102 can be received from a remote user/client compute device, or the input data stream 102 can be a locally-generated data stream (e.g., generated by one or more ML models that are geographically or physically co-located with system 100). Data from the received data stream 102 can be analyzed (e.g., arranged by time increments "t," "t−1," etc.) and a plurality of metrics 104 can be calculated or generated based on the data. The metrics 104 can be single metrics (also referred to herein as "individual data-level metrics," discussed below) and/or joint metrics (also referred to herein as "aggregate data-level metrics," discussed below). Examples of single metrics (e.g., based on computations performed on a single coherent or homogeneous subset of the input, intermediary outputs, final outputs and/or individual data sets from the received data stream— also referred to herein as "non-aggregated data metrics") can include, but are not limited to: minimum, maximum, mean, average, and variance. Examples of joint metrics (e.g., based on multiple data or data sets from the received data stream— also referred to herein as "aggregated data metrics") can include, but are not limited to: data drift, covariance, Kolmogorov-Smirnov ("K-S") statistic(s), and incremental K-S statistic. The Kolmogorov-Smirnov statistic quantifies a distance between the empirical distribution function of the sample and the cumulative distribution function of the reference distribution, or between the empirical distribution functions of two samples. The calculation or generation of the metrics 104 can be based on training data, past (historical) inputs to the system 100, and/or past (historical) metrics 104. One or more alerts 105 (denoted as $m_1$ through $N_{1-T}$ in FIG. 1) can be identified or generated based on the metrics 104, and optionally sent to one or more users of the system 100, one or more compute devices associated with the user(s), or displayed via a graphical user interface (GUI) of the system 100. Optionally, one or more of the alerts 105 can specify (i.e., include a representation of) one or more remediation actions that are to be taken, or can trigger an automatic action that includes a remediation. Examples of remediation actions can include, but are not limited to:

resampling of new input data 108, adaptation of training data, resampling of data from the data stream 102, retraining of the ML model 110A (with or without resampling of data from the data stream 102), taking the ML model 110A out of production, adaptation of training data used to train an ML model that generated the data stream 102 (e.g., a user's ML model), retraining of the ML model that generated the data stream 102, and taking the ML model that generated the data stream 102 out of production.

Input data 108 can be generated based on the data stream 102, or extracted from the data stream 102, and provided as an input to an explainer 110. Non-limiting examples of input data 108 include salary, outstanding debt, and length of credit history. Reference data 106 is also provided as an input to an explainer 110. The reference data 106 can be stored in a local memory and sent from the local memory to the explainer 110. Alternatively or in addition, the reference data 106 can be generated based on the data stream 102 before being provided to the explainer 110. Non-limiting examples of reference data 106 include protected classes, such as race, sexual orientation, and gender.

During operation of the explainer 110, the ML model 110A generates intermediate outputs 110B based on the input data 108 and the reference data 106. The intermediate outputs 110B can be analyzed (e.g., arranged by time increments "t," "t−1," etc.) and a plurality of metrics 112 can be calculated or generated based on the intermediate outputs 110B. The metrics 112 can be single metrics and/or joint metrics. Examples of single metrics 112 (e.g., based on individual data or data sets from the received data stream— also referred to herein as "non-aggregated data metrics") can include, but are not limited to: minimum Local Interpretable Model-Agnostic Explanations ("LIME") value, maximum LIME value, variance of LIME value, and gradient values. Each of the single metrics can be calculated across a predefined number "T" of runs (i.e., operational cycles of the explainer 110). Examples of joint metrics (e.g., based on multiple data or data sets from the received data stream— also referred to herein as "aggregated data metrics") can include, but are not limited to: rate of change of averages or minimums over LIME values, rate of change of averages or minimums over Shapley Additive Explanation ("SHAP") values, and portions of the ML model that are less active (e.g., for the window of time encompassing the T runs, as compared to an older/historical window of T runs). Similar to the alerts 105, one or more alerts 113 can be identified or generated based on the metrics 112, and optionally sent to one or more users of the system 100, one or more compute devices associated with the user(s), or displayed via a graphical user interface (GUI) of the system 100. Optionally, one or more of the alerts 113 can specify (i.e., include a representation of) one or more remediation actions that are to be taken, or can trigger an automatic action that includes a remediation. Examples of remediation actions can include, but are not limited to: resampling of new input data 108, adaptation of training data, resampling of data from the data stream 102, retraining of the ML model 110A (with or without resampling of data from the data stream 102), taking the ML model 110A out of production, adaptation of training data used to train an ML model that generated the data stream 102 (e.g., a user's ML model), retraining of the ML model that generated the data stream 102, and taking the ML model that generated the data stream 102 out of production.

The model output 114, generated by the explainer 110, can be analyzed (e.g., arranged by time increments "t," "t−1," etc.) and a plurality of metrics 116 can be calculated or generated based on the model output 114. The metrics 116 can be single metrics and/or joint metrics. Examples of single metrics (e.g., based on individual data or data sets from the received data stream—also referred to herein as "non-aggregated data metrics") can include, but are not limited to: minimum, maximum, mean, average, variance, and rate of change. Each of the single metrics can be calculated over one or more subsets of the data stream associated with inferences of one or more class labels with the last T inferences. Examples of joint metrics (e.g., based on multiple data or data sets from the received data stream— also referred to herein as "aggregated data metrics") can include, but are not limited to: rate of change of averages, and differences in maximums. The joint metrics can be computed across two windows (e.g., the last T inferences and another set of T inferences from another time period). Similar to the alerts 105 and 113, one or more alerts 117 can be identified or generated based on the metrics 116, and optionally sent to one or more users of the system 100, one or more compute devices associated with the user(s), or displayed via a graphical user interface (GUI) of the system 100. Optionally, one or more of the alerts 117 can specify (i.e., include a representation of) one or more remediation actions that are to be taken, or can trigger an automatic action that includes a remediation. Examples of remediation actions can include, but are not limited to: resampling of new input data 108, adaptation of training data, resampling of data from the data stream 102, retraining of the ML model 110A (with or without resampling of data from the data stream 102), taking the ML model 110A out of production, adaptation of training data used to train an ML model that generated the data stream 102 (e.g., a user's ML model), retraining of the ML model that generated the data stream 102, and taking the ML model that generated the data stream 102 out of production.

As can be seen in FIG. 1, three distinct sets of metrics (104, 112, and 116) and three distinct sets of alerts (105, 113, and 117) can be generated during operation of the system 100, with each associated set occurring at a different "phase" in the system 100 operations. The metrics 104 and alerts 105 can be referred to as "pre-model" metrics and alerts; the metrics 112 and alerts 113 can be referred to as "intra-model" (or "intermediary"/intermediate/interim) metrics and alerts; and the metrics 116 and alerts 117 can be referred to as "post-model" metrics and alerts. Each set of metrics and alerts can provide a different type of monitoring insight into the performance and "health" (also "lack of bias," "accuracy," "noisiness," "completeness," or "freshness" (i.e., not out of date)) of one or more ML systems. The monitoring facilitated by the system of FIG. 1 (i.e., the generation of the metrics and the generation/issuance of the alerts) can be performed in real time or near-real-time (e.g., real time minus any computing-related delays), and can be applied to one ML model (e.g., that produces the incoming data stream 102), or to some or all ML models operating within a given organization.

In some embodiments, the system 100 is configured (e.g., via the metrics 104, 112, and 116) to one or more of: detect data drift (based on pre-defined settings, rules or parameters, or based on user-defined settings, rules or parameters), detect fairness or bias (based on pre-defined settings, rules or parameters, or based on user-defined settings, rules or parameters), assess explainability (based on pre-defined settings, rules or parameters, or based on user-defined settings, rules or parameters), provide visualizations of the monitored values (e.g., via a GUI of the system 100), calculate various levels of "risk scores" (also referred to herein as "health scores") for datasets, ML models, and combinations of ML models (combinations of ML models also referred to herein as "systems"), provide proactive and automated notification of problems (i.e., performance issues) based on the risk scores (and, optionally, based on at least one additional score), and provide a scalable system for the live monitoring of metrics.

A variety of combinations of the metrics 104, 112, and 116 and other data generated within the system 100 can be used to measure the performance of an ML model or system. Examples include:

Data drift+Explainability (e.g., feature importance)—facilitates sorting, in order of decreasing importance, by combination of global/local feature importance & data drift metric(s).

Fairness/Bias+Explainability (e.g., feature importance)—facilitates sorting, in order of decreasing importance, via a combination of fairness metric (e.g., with higher values being less desirable) and feature importance. An example edge case can include entirely filtering out certain specifies feature-bias combinations.

Data-level risk score+ML model-level risk score+proactive monitoring—facilitates the real-time monitoring of multiple models/data streams at once, for large numbers of ML models and/or for complicated risk scores.

In some embodiments, by combining user-defined logical monitoring rules with the automation of system 100 of FIG. 1, proactive monitoring of ML system operations can be achieved at a scale beyond what a human could feasibly accomplish.

In some embodiments, metrics may compare live data to offline/static training data. Such metrics may include statistical tests such as Kolmogorov-Smirnov and Kuiper's, or f-divergence-based tests such as the commonly-used Kullback-Leibler (KL) divergence. In general, more sophisticated metrics related to data drift and data fidelity may involve additional semantic input from outside sources. The metrics and statistics computable on a single or pairs of data sets/distributions described herein are presented by way of example only, and other metrics and statistics can also be computed by the embodiments set forth herein. Metrics that are computed based on a single data set or distribution can be referred to as individual data-level metrics, and aggregate data-level metrics can refer to metrics that are computed based on multiple data sets or data distributions. When a coarser level of detail is appropriate, the set of individual data-level metrics and aggregate data-level metrics are referred to simply as data-level metrics. Additional detail is provided below, with reference to FIG. 2.

Figure 2:
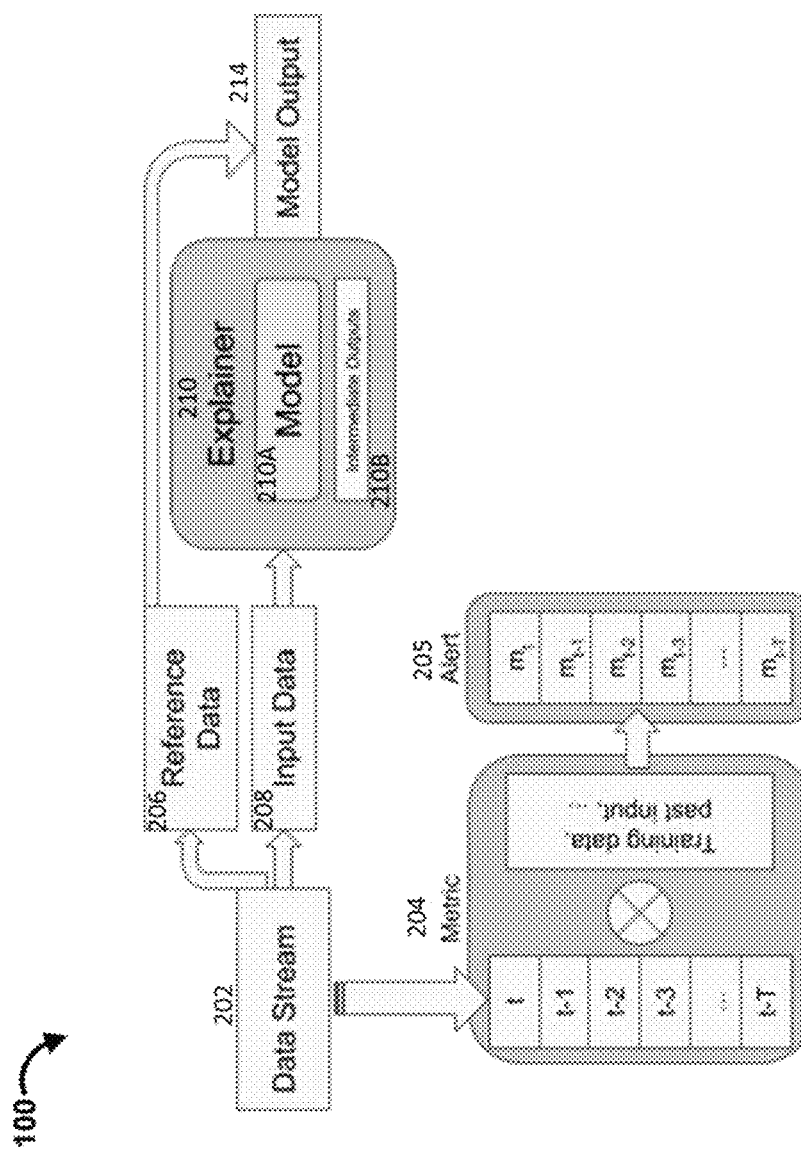
FIG. 2 is a diagram of an example machine learning monitoring system, showing metrics and alerts applied to an incoming data stream, with comparisons against live data and past data, according to an embodiment.

FIG. 2 is a diagram of an example machine learning monitoring system, similar to the system 100 of FIG. 1 (including a data stream 202, reference data 206, input data 208, explainer 210 with ML model 210A and intermediate outputs 210B, and model output 214), showing pre-model metrics 204 and alerts 205 applied to the incoming data stream 202, with comparisons against live data and past data, according to an embodiment. A first example alert 205 can include: IF the K-S statistic remains above a critical value of 80% of T time periods, THEN ACT resample and retrain the model. A second example alert 205 can include: IF input variance increases for T time periods AND input variance is above 10 THEN ACT email user. A third example alert 205 can include: IF input minimum=0 AND input maximum=0 for T time periods, THEN ACT take model out of production.

Some embodiments may assume one or more of the following: access to a true underlying data distribution or a complete underlying data set, access to a sample or samples from the preceding in the form of training data sets, and streaming and/or historical access to input data that will be or has been run through the ML models in the machine-learning-based system. Given such access, some embodiments may include computing individual data-level metrics and aggregate data-level metrics in real-time, and store those computed metrics along with associated timestamps.

In some embodiments, metrics are computed during an inference period or at an inference time, i.e., after the input data has been received by the ML model or models, but before an output has been produced. These metrics can, in turn, lead to alerts based on the inference-time-computed metrics, or compound functions of multiple alerts and multiple metrics, discussed further below. A visualization of inference-time metrics and alerts is provided in FIG. 3.

Figure 3:
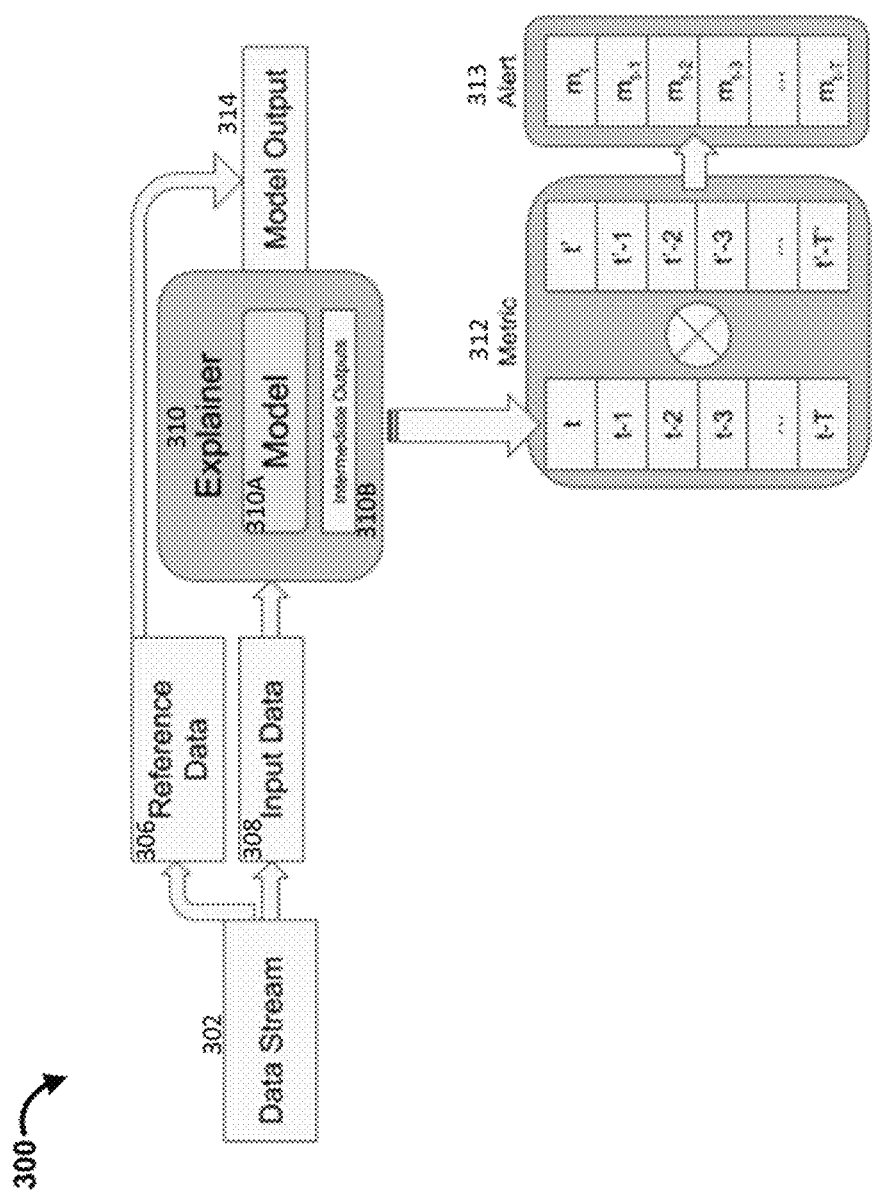
FIG. 3 is a diagram of an example machine learning monitoring system, showing metrics and alerts applied at inference time to a stream of input data, with associated metadata optionally fed into the model), and with comparisons against live and past data, according to an embodiment.

FIG. 3 is a diagram of an example machine learning monitoring system, similar to the system 100 of FIG. 1 (including a data stream 302, reference data 306, input data 308, explainer 310 with ML model 310A and intermediate outputs 310B, and model output 314), showing intra-model metrics and alerts, applied at inference time(s) to the intermediate outputs, with associated metadata optionally fed into the ML model 310A), and with comparisons against live and past data, according to an embodiment. An example alert 313 can include: IF maximum of LIME value for feature F is less than 0.0 for 90% of periods in T THEN ACT email user.

Figure 4:
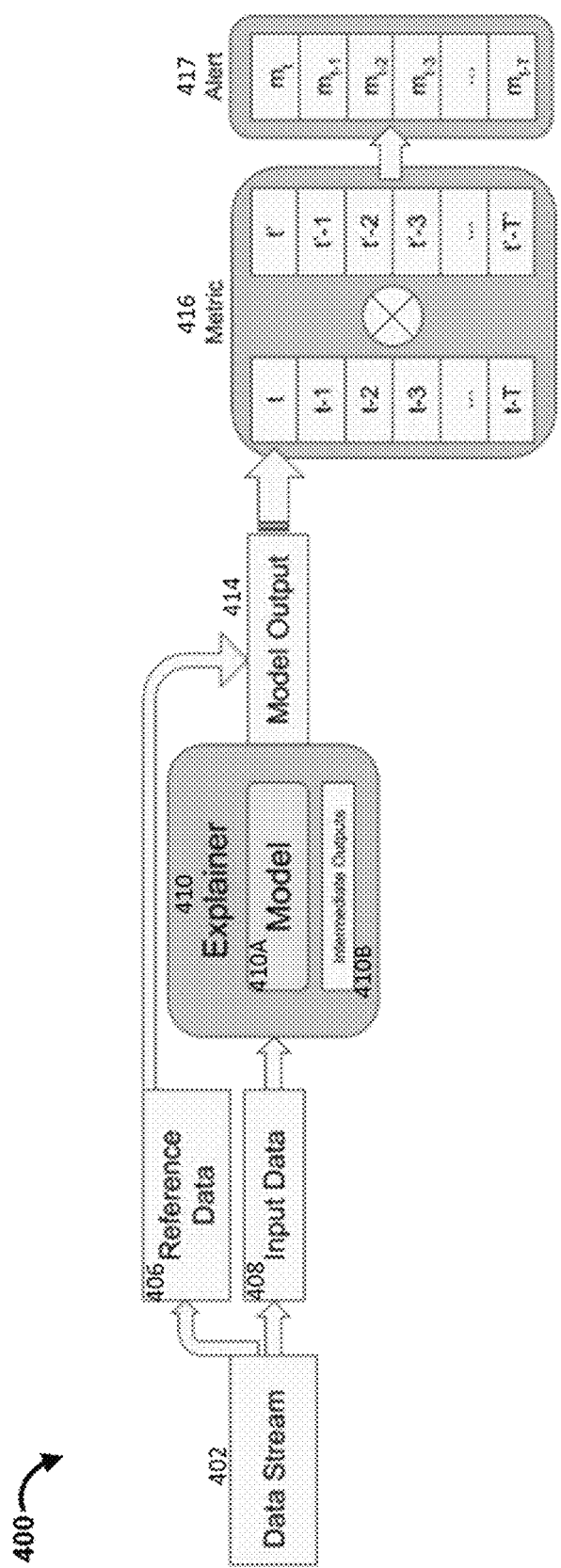
FIG. 4 is a diagram of an example machine learning monitoring system, showing metrics and alerts applied to outgoing inference/model output streams, with comparisons against live and past data, according to an embodiment.

In some embodiments, and in a manner that is qualitatively similar to the pre-model and during-inference cases, metrics, risk scores, and alerts can be computed on inferences/model outputs, as shown in FIG. 4. In some such embodiments, metrics that may involve or be based on the streaming outputs and/or that may also involve comparisons of those outputs to a window of past outputs or reference outputs may be fed into alert functions that may trigger automated, semi-automated, or human-initiated actions, as discussed further below.

In some embodiments, a system includes an explanation service/capability (e.g., via an explainer). For example, given access to one or more ML models (e.g., of a client or user) and to metadata associated with the ML model(s), the system may compute in real-time, and store, various model-level metrics and data-level metrics, as described above. A client or user can optionally also (or alternatively) provide an explainer "module" (i.e., software or set of processor-executable instructions) or set of modules. Each explainer module may be configured to perform an automated method that returns, for any output, weights for features or sets of features representing a significance, a strength, or a saliency of those features or sets of features to a user. Some embodiments may be indifferent (or agnostic) to whether the explainer is model-supplied or user-supplied (or both). In the case of one or more user-supplied explainers being provided, the system may not assess the complexity or validity of the supplied explainer(s). For example, one user might provide a simple linear regression model with an explainer that simply outputs coefficients for features in that same linear regression model, whereas another user might provide an explainer that always returns a random number or a constant. In such settings, the user is explicitly telling the system how to operate on input and output pairs (where the input is fed into a model) and translate those to user-described interpretable metrics. In one or more embodiments, a system includes or uses one or more explainers such as a LIME explainer, a SHAP explainer, and/or can be configured to perform other methods such as human-AI teaming. Additional details for suitable LIME explainers can be found, by way of example, in "'Why Should I Trust You?' Explaining the Predictions of Any Classifier," by M. T. Ribiero, et al., *SIGKDD* (2016), the contents of which are incorporated by reference herein in their entirety, for all purposes. Additional details for suitable SHAP explainers and other similar explainers can be found, by way of example, in "A Unified Approach to Interpreting Model Predictions," by S. Lundberg, et al., Advances in Neural Information Processing Systems 30 (NIPS) (2017), and in "An Efficient Explanation of Individual Classifications using Game Theory," by E. Strumbelj, et al., Journal of Machine Learning Research 11 (2010), and in "Explaining Prediction Models and Individual Predictions with Feature Contributions," by E, Strumbelj, et al., Knowledge and Information Systems 41, 647-665 (2014), the contents of each of which are incorporated by reference herein in their entireties, for all purposes. Additional details for suitable human-AI teaming methods can be found, by way of example, in "Examples are not Enough, Learn to Criticize! Criticism for Interpretability," by B. Kim, et al., 29th Conference on Neural Information Processing Systems (NIPS) (2016), the contents of which are incorporated by reference herein in their entirety, for all purposes.

In one or more embodiments, once user ML model(s), metadata associated with the ML model(s), and user explainer(s) are received, the system may register the ML models and metadata, create or identify datastores for recording inferences, explanations, and associated metrics, and generate an aggregate explainer that includes the user-provided explainers and one or more additional explainers such as those described above (e.g., LIME, SHAP). One or more of the user ML model(s), the metadata associated with the ML model(s), the user explainer(s), the one or more additional explainers, or the aggregate explainer can also be sent to or fed into a portion of the system (e.g., explainer 310 in FIG. 3) that performs an "explanation service."

In some embodiments, the explanation service includes two core services. The first service includes providing explanatory informatics to the user, for example via updates to Web user interfaces ("UI"s) and/or mobile UIs. The explanatory informatics can include, for example, one of more visualizations, such as: histograms corresponding to feature importance (e.g., where higher values are assigned to higher importance features); for visual data, highlighting one or more subset of an image to bring attention to higher-importance regions of the input image or video; and line charts depicting explanatory metrics at a specific point in time, over time, or aggregates of such metrics. The second service includes providing explanatory metrics to the system. These explanatory metrics can be broken down into three or more classes, such as model-level explanatory metrics, feature-level explanatory metrics, and inference-level explanatory metrics. These explanatory metrics may be real-valued weights associated with: individual features, sets of features, the models themselves (optionally with timestamps), and/or associated inference input/output pairs from the user's ML model(s). Metrics can be combined across levels and across time, e.g., to track changes in an importance of a feature, or to track changes in an importance of a set of features.

Figure 5:
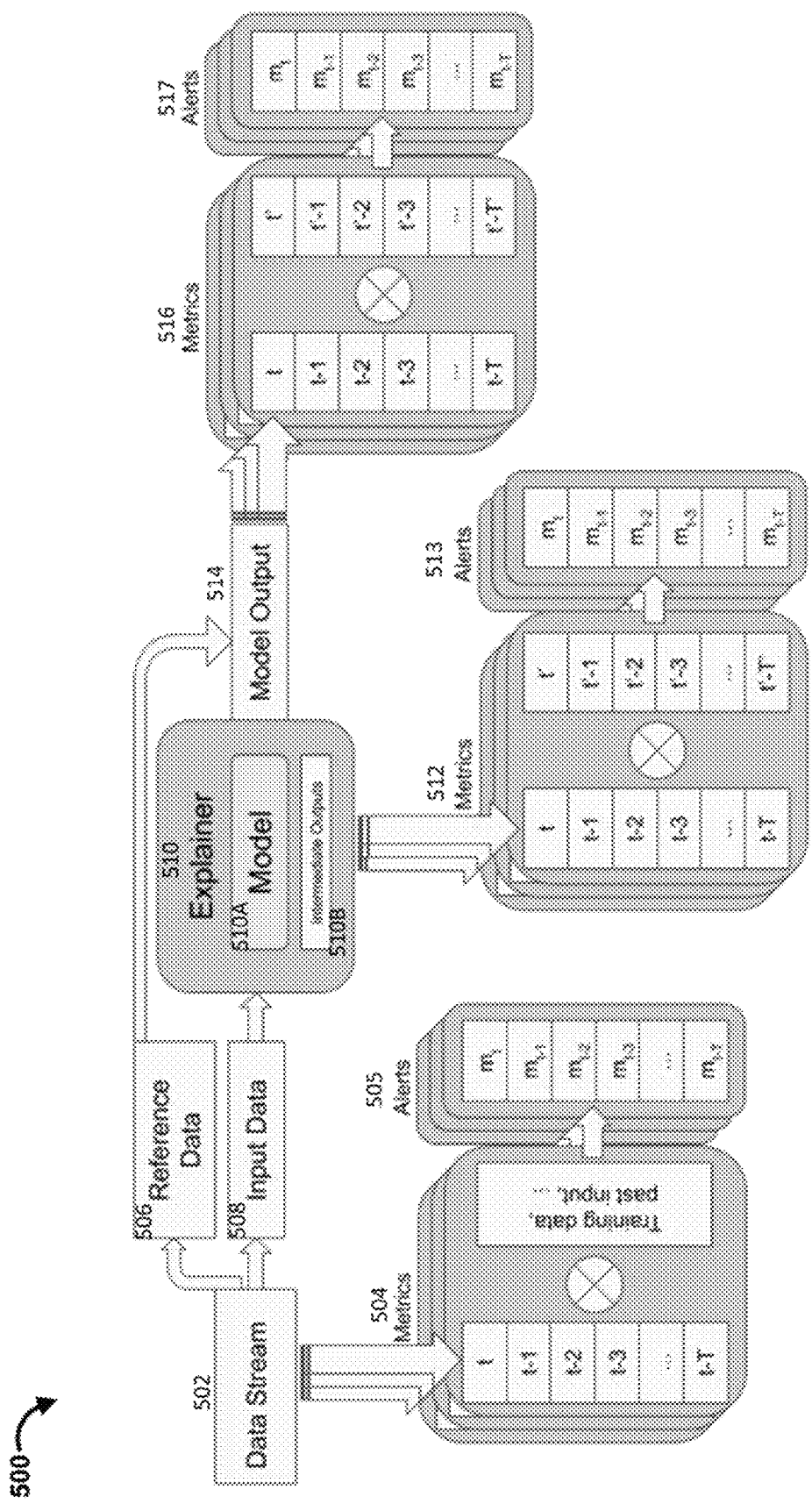
FIG. 5 is a diagram of an example machine learning monitoring system, showing metrics and alerts applied to each stage (pre-model, intra-model (or intermediary), and post-model), and in which alerts can trigger as a function of other alerts in the same vertical, or across each segment of the system, according to an embodiment.
Figure 6:
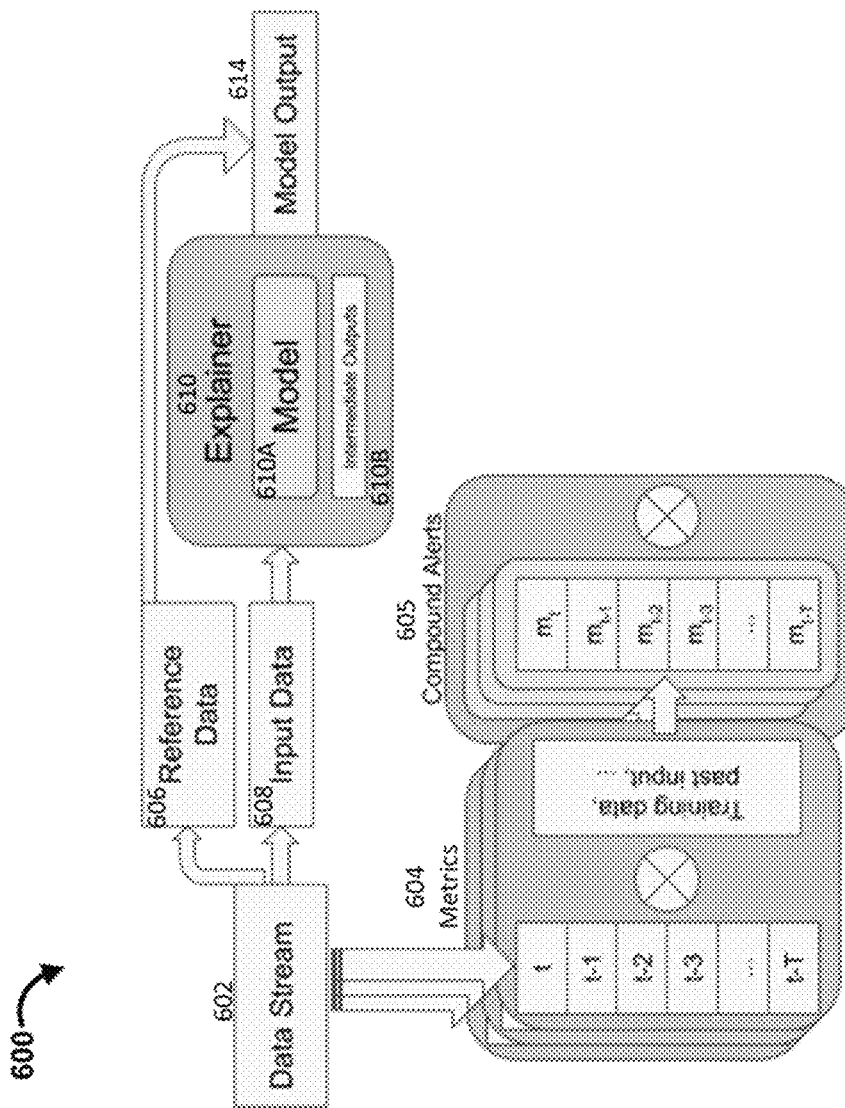
FIG. 6 is a diagram of an interactive machine learning monitoring system, showing the generation of an example compound alert in the pre-model (i.e., incoming data) stage, according to an embodiment.

One or more system embodiments may aggregate model-level performance metrics, data-level metrics, and output from the explanation service (i.e., explanatory metrics) into an overall health score for (i) an individual ML model, (ii) a set of ML models, and (iii) an overall score for the full ML-based system. The system may use pre-set default thresholds, or may derive from data (e.g., via the Kolmogorov-Smirnov or Kuiper's test statistics rising above a particular threshold, or via time series anomaly-detection based approaches that take into account seasonality, such as those described in "Forecasting at Scale" by S. J. Taylor and B. Letham, *The American Statistician*, Vol. 72, No. 1, 37-45 (2018), the entire contents of which are herein incorporated by reference in their entirety) a current metric-level risk score for each of the metrics. Examples of the foregoing functionality are shown in FIGS. 5 and 6.

In some embodiments, a user can set/define (e.g., via a GUI) numeric tolerance thresholds for any of the model-level metrics and data-level metrics, and the user-defined numeric tolerance thresholds can override one or more default thresholds of the system or derived by the system automatically from data. Then, the system may combine the metric-level risk scores into a single model-level risk score (for case (i) above—an individual ML model), representing an overall risk of model failure (with regard to model-level performance, bias, or otherwise undesirable decisioning as determined by the system or a user-set threshold, for any of the model-level performance metrics). The combination of the risk scores may be performed using an interpretable method (such as falling rule lists, for example as described in "Falling Rule Lists" by F. Wang and C. Rudin, *Artificial Intelligence and Statistics* (2015), the entire contents of which are herein incorporated by reference in their entirety). Examples of model-level risk scores are provided in the discussions of each of FIGS. 2-4. In FIGS. 2-4, the risk scores are the logical heads of the first-order statements in the figures (the text between IF and THEN ACT). The user can then drill down into the model-level risk score to understand the dimensions in which a particular ML model is performing well or poorly.

In some embodiments, model-level risk scores are computed by a system, in a manner similar to that described above. Alternatively or in addition, the system can use a similar process to compute aggregate model-level risk scores across multiple ML models (for case (ii) above—a set of ML models). As discussed above, the system may use pre-set default thresholds (e.g., "at most one model can have its accuracy metric drop below X %") or may derive from data (e.g., by identifying anomalous behavior in a small subset of the set of models or by identifying lockstep degradation of a majority of the models' performance metrics) a series of indicators that may be aggregated into a risk score across the multiple ML models. Such aggregation may be performed using an interpretable method, allowing user-level interpretability of the risk score. Alternatively or in addition, the system may compute a system-wide risk score by combining the methods for cases (i) and (ii). For example, as shown in FIG. 3, multiple metrics and multiple alerts can be computed at each stage of a single ML model's deployment, and the addition of multiple ML models may be qualitatively the same, with an additional connection across each ML model (and between each ML model's associated metrics and alerts).

In some embodiments, a system uses model-level risk scores, aggregate model-level risk scores, and system-wide risk scores to automatically trigger an action or to semi-automatically (e.g., similar to automatically, but requesting or requiring a human/user to respond to or interact with a prompt before completing the action) trigger an action. Example actions may include emailing a user; generating, sending, or displaying a modal alert to the user based on a threshold (e.g., a maximum or a minimum) single risk score; or generating, sending, or displaying a modal alert based on a function of (or rule based on) multiple risk scores (e.g., if (score1+score2=>threshold1) or (score1>threshold2 and score3<threshold3)). The system may also facilitate more complicated automated and semi-automated actions. For example, regret bounds (from the transfer learning literature) can be used to trigger resampling of new data, or to trigger adaptation of the source training data, followed by retraining of a ML model or models. Additional details on the use of regret bounds can be found, by way of example, in "Regret Bounds for Transfer Learning in Bayesian Optimisation," A. Shilton, et al., Proceedings of the $20^{th}$ International Conference on Artificial Intelligence and, PMLR 54:307-315 (2017), the contents of which are incorporated by reference herein in their entirety, for all purposes. Related actions may include (i) retraining without resampling and (ii) taking a model out of production, based on any of the threshold-based methods or bound-based methods listed above. Fully automated or semi-automated actions can also be triggered from combinations of model-level metrics and data-level metrics such as average inference rate (optionally scaling down the average inference rate if close to a rate limit, or scaling up hardware to increase the rate limit).

In some embodiments, actions can be triggered to improve model-level explanatory metrics. For example, model robustification via the use of additional training data can make the ML model more interpretable and/or less sensitive to the effects of random variability or noise. Additional sampling may be triggered based on functions applied to the outputs of user-supplied explainers or system-supplied explainers. For example, in some embodiments, if the entropy of explanatory weights of a large set of features is determined to be too high (e.g., above a predefined threshold) across a large set of inferences, it may be the case that the explainer is not working well and might benefit from additional data being incorporated into the base ML model. In other embodiments, the system may cluster inputs or outputs based on computed feature importances, observe a goodness of fit metric for that clustering (e.g., maximum radius or average distance), and/or make a determination to resample or take a ML model out of production.

FIG. 4 is a diagram of an example machine learning monitoring system, similar to the system 100 of FIG. 1 (including a data stream 402, reference data 406, input data 408, explainer 410 with ML model 410A and intermediate outputs 410B, and model output 414), showing post-model metrics 416 and alerts 417 applied to outgoing inference/model output 414 streams, with comparisons against live and past data, according to an embodiment. A first example alert 417 can include: IF all predicted class labels are of the same class for T time periods THEN ACT email user (e.g., for scenarios in which there are no true/"gold standard" labels). A second example alert 417 can include: IF accuracy falls below 90% for T periods THEN ACT take model offline AND email user with high priority (e.g., for a straightforward threshold case, with a true/gold standard label). A third example alert 417 can include: IF temporal behavior (e.g., seasonality shift, "peak time" in use) in predicted value over T periods differs from behavior of predicted value over older window of T' periods THEN ACT email user (e.g., for anomaly detection over two time series outputs, with no true/gold standard labels).

FIG. 5 is a diagram of an example machine learning monitoring system, similar to the system 100 of FIG. 1 (including a data stream 502, reference data 506, input data 508, explainer 510 with ML model 510A and intermediate outputs 510B, and model output 514), showing metrics (504, 512, 516) and alerts (505, 513, 517) applied to each stage (pre-model, intra-model, and post-model), and in which alerts can trigger as a function of other alerts in the same vertical, or across each segment of the system, according to an embodiment. As an example, consider that two models ("Model A" and "Model B") are running simultaneously, and that each of the two models has an associated alert ("Alert A" and "Alert B," respectively) set, as follows: IF accuracy drops below 90% for one day THEN ACT email user." A new alert can be constructed as a function of Alert A and Alert B: IF (Model A triggers ALERT A at least once during time period T) AND (Model B triggers ALERT B at least once during time period T) THEN ACT (retrain Model A); (retrain Model B). Each of the three measurement and alert hooks—input, intermediary, and output—can use multiple metrics and multiple alert types. Each metric can use a different window of data (e.g., the most recent 60 seconds of data, samples from the most recent 60 minutes, and samples from the most recent 24 hours), and compare against a different baseline (e.g., the penultimate (or second most recent) 60 seconds, 60 minutes, or 24 hours). Individualized alerts can be built for each metric, at each of the three hooks.

FIG. 6 is a diagram of an interactive machine learning monitoring system, similar to the system 100 of FIG. 1 (including a data stream 602, reference data 606, input data 608, explainer 610 with ML model 610A and intermediate outputs 610B, and model output 614), showing the generation of an example compound alert in the pre-model (i.e., based on incoming data) stage or portion of the model, according to an embodiment. In the system of FIG. 6, an alert fires as a function of one or more other alerts and/or metrics, and triggers either an automated action or an email or other notification to a user. Individual alerts can fire based on functions run on stored windows of outputs from individual metrics. Compound metrics can be built over multiple alerts and/or windows of outputs from multiple individual metrics. For example, given a first individual alert: IF K-S statistic stays above a critical value for 80% of T time periods THEN ACT email user, and given a second individual alert: IF input minimum=0 AND input maximum=0 for T time periods, THEN ACT email user, a compound alert can be: IF Individual Alert 1 fires AND Individual Alert 2 fires THEN ACT take model out of production.

In some embodiments, alerts can be generated as a function of an incoming data stream (e.g., as shown in FIG. 2), as a function of intermediary processing involving the ML model and/or explainer (e.g., as shown in FIG. 3), or as a function of the inferences/ML model outputs themselves (e.g., as shown in FIG. 4). Alerts and their associated automated actions, semi-automated actions and/or human-initiated actions can take into account any of the metrics, scores, alerts, or any function of any subset of those elements, for example as discussed with reference to FIG. 6.

In one or more embodiments, a system is configured to generate a simulated environment in which users can view and manipulate/interact with each individual decision for which a user ML model has predicted a certain outcome. For each such outcome, users can view the relative importance of each feature that went into the model's representation of that outcome, to assess the factors that played the biggest role in creating the outcome as it turned out to be. (See also the discussion of the "explanation service," above).

In some embodiments, a system includes a "what-if scenario generator" that allows users to replace individual feature values with hypothetical values, and re-compute that individual inference decision such that its new feature set is representative of the changes made by the user. Such functionality allows users to speculate about the ML model's behavior without experimenting on live user data of their own. As an example, consider a ML model that takes, as its inputs, two features, "Age" and "Gender," and predicts one output, "Weight." Here, "Age" is constrained to take non-negative real values (e.g., "Age=12.1" or "Age=94"), "Gender" is constrained to take one of a fixed number of categorical values (e.g., "Gender=Man", "Gender=Trans Man", "Gender=Woman", "Gender=Trans Woman", "Gender=Non-Binary", and so on), and "Weight" is constrained to take a non-negative real value (e.g., "Weight=144.1"). Then, suppose an individual inference is run such that the input "Age=12," "Gender=Female" returns "Weight=67.1." Then, the user can "virtually" change input feature values, via the what-if scenario generator, and observe an expected or predicted difference in outcome. For example, for the inference run above, the user might change the "Age" input feature value from "Age=12" to "Age=13," and observe the resulting predicted output "Weight=73.2," or change the "Gender" input feature value from "Gender=Female" to "Gender=Male," and observe the resulting predicted output "Weight=77.2." Such simulation functionality may be accessible via the system's interface directly, or programmatically via an application programming interfaced ("API").

Figure 7:
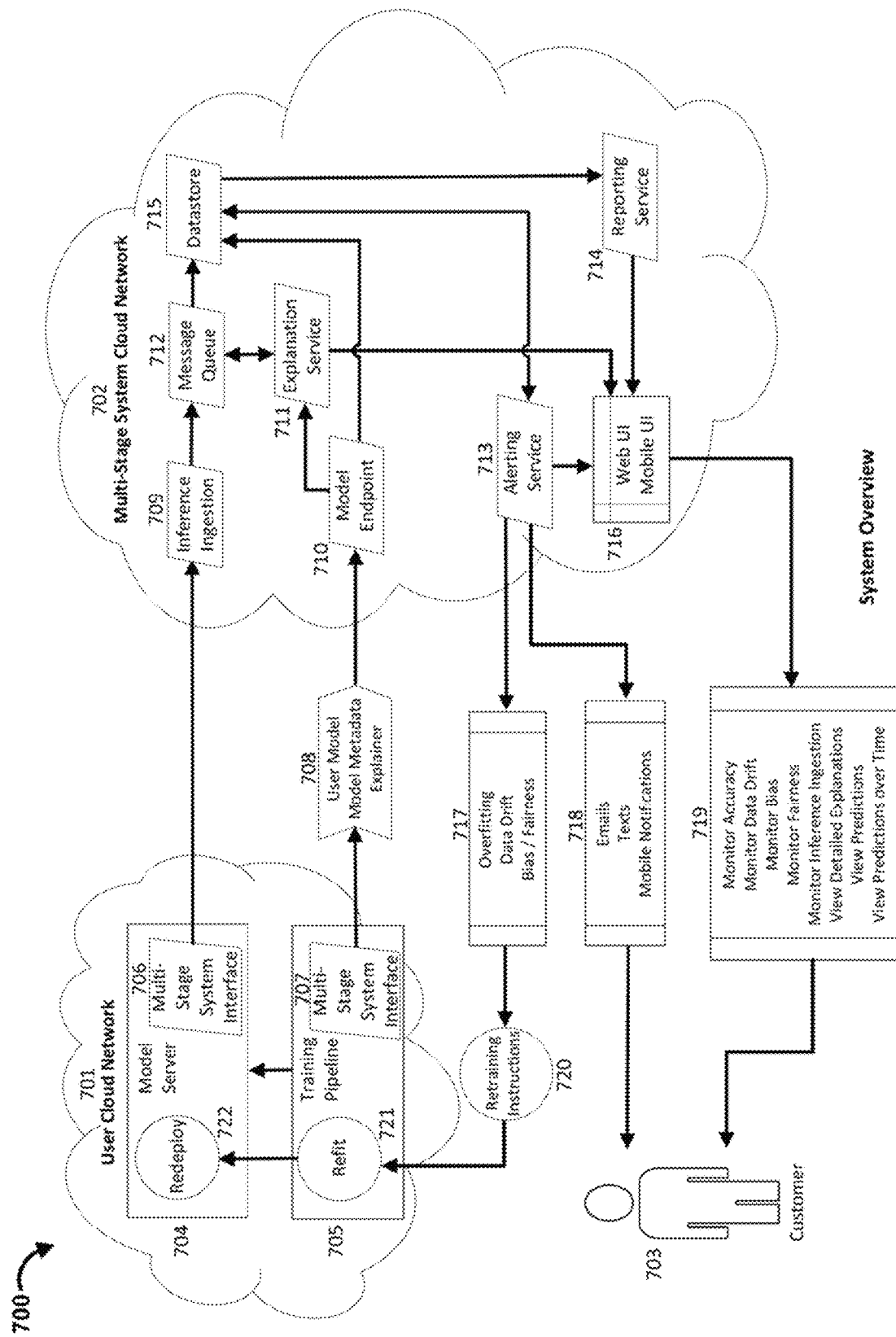
FIG. 7 is a diagram of an example machine learning monitoring system, according to an embodiment.

FIG. 7 shows an example interactive machine learning monitoring system, according to an embodiment. As shown in FIG. 7, the machine learning monitoring system 700 includes a user cloud network 701 and a multi-stage system cloud network 702 (e.g., including a system such as the system 100 of FIG. 1). The user cloud network 701 is a hosted computer infrastructure that may be owned, used and/or maintained by one or more users 703. The multi-stage system cloud network 702 is a hosted computer infrastructure that may be owned, used and/or maintained by the one or more users 703. The user cloud network 701 includes a model server 704 and a training pipeline 705. The model server 704 generates AI predictions, and the training pipeline 705 is a process that selects, trains, creates, or generates AI models. A multi-stage system interface 706 (e.g., implemented via a software development kit ("SDK")) sends production inferences to the multi-stage system cloud network 702. A multi-stage system interface 707 (e.g., implemented via a SDK) can generate one or more explainers and communicate with the multi-stage system cloud network 702 to register the one or more explainers with the multi-stage system cloud network 702 (e.g., including sending the one or more explainers to the multi-stage system cloud network 702). For example, at 708, a user model, model metadata associated with the user model, and one or more explainers are sent to the multi-stage system cloud network 702.

Inference ingestion 709 is an API in the multi-stage system cloud network 702 that receives new feature values (e.g. including input data, such as input data 608 in FIG. 6) from the multi-stage system interface 706. Model endpoint 710 is an API in the multi-stage system cloud network 702 that receives (from the multi-stage system interface 707), generates, and/or modifies one or more model configurations, files, and metadata. The model endpoint 710 can update one or more of at least the following components of FIG. 6: explainer 610, model 601A, reference data 606. The model endpoint 710 can also impact (e.g., be used to modify) custom metrics being tracked (e.g., metrics 104, 112, and/or 116 in FIG. 1) and/or custom registered alerts for that model (e.g., alerts 105, 113, and/or 117 in FIG. 1).

Explanation service 711 (e.g., implemented via an explainer, such as explainer 610 in FIG. 6) is an SDK (optionally including one or more APIs) in the multi-stage system cloud network 702 that calculates explainability values, for example using one or more techniques such as LIME and SHAP to determine feature values. Message queue 712 is a streaming message queue that buffers data (e.g., event) received at the multi-stage system cloud network 702. Alerting service 713 is an alert management system that emits and handles configuration of alerting based on default specifications and/or user specifications. Reporting Service 714 is an SDK (optionally including one or more APIs) that provides consumable report data. Datastore 715 is a database that stores all relevant models, inferences, metadata, user data, etc. The Web UI and Mobile UI 716 are front-end interfaces, such as GUIs, that receive and present information from various APIs, and allow for user configuration/reconfiguration. Outputs 717 of the alerting service 713 (e.g., overfitting, data drift, bias, fairness) can be used to configure model retraining instructions. Communications 718 (e.g., emails, short message service (SMS) text messages, mobile notifications, etc.) can be sent from the alerting service 713 to the user(s) 703 (e.g., for display on a compute device of the user(s) 703). Outputs 719 of the Web UI and/or mobile UI 716 (e.g., accuracy monitoring data, data drift monitoring data, bias monitoring data, fairness monitoring data, inference ingestion monitoring data, detailed explanations, predictions, and predictions over time) can also be sent to the user(s) 703 (e.g., for display on a compute device of the user(s) 703). Model retraining instructions 720 (e.g., based on the outputs 717) can be generated and sent to the training pipeline 705 to address unwanted overfitting, data drift, bias, or unfairness. The multi-stage system cloud network 702 can trigger an automated/automatic retraining process 721 in the training pipeline 705. The multi-stage system cloud network 702 can also trigger an automated/automatic redeployment process 722 that causes the user(s)' newly-retrained model to the model server 704.

Figure 8A:
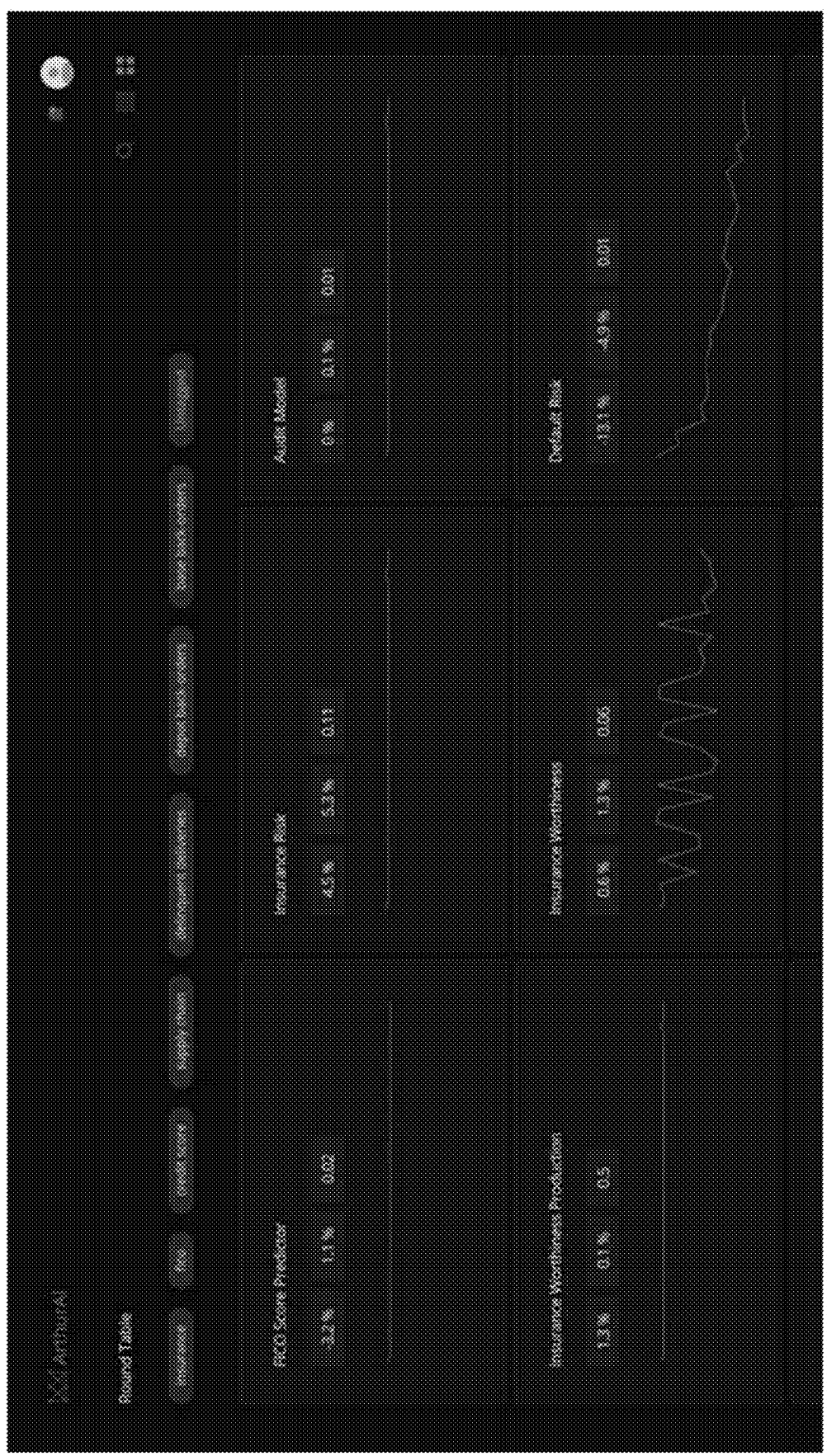
FIGS. 8A-8H are example screenshots of an interactive machine learning monitoring system user interface, according to an embodiment.
Figure 8B:
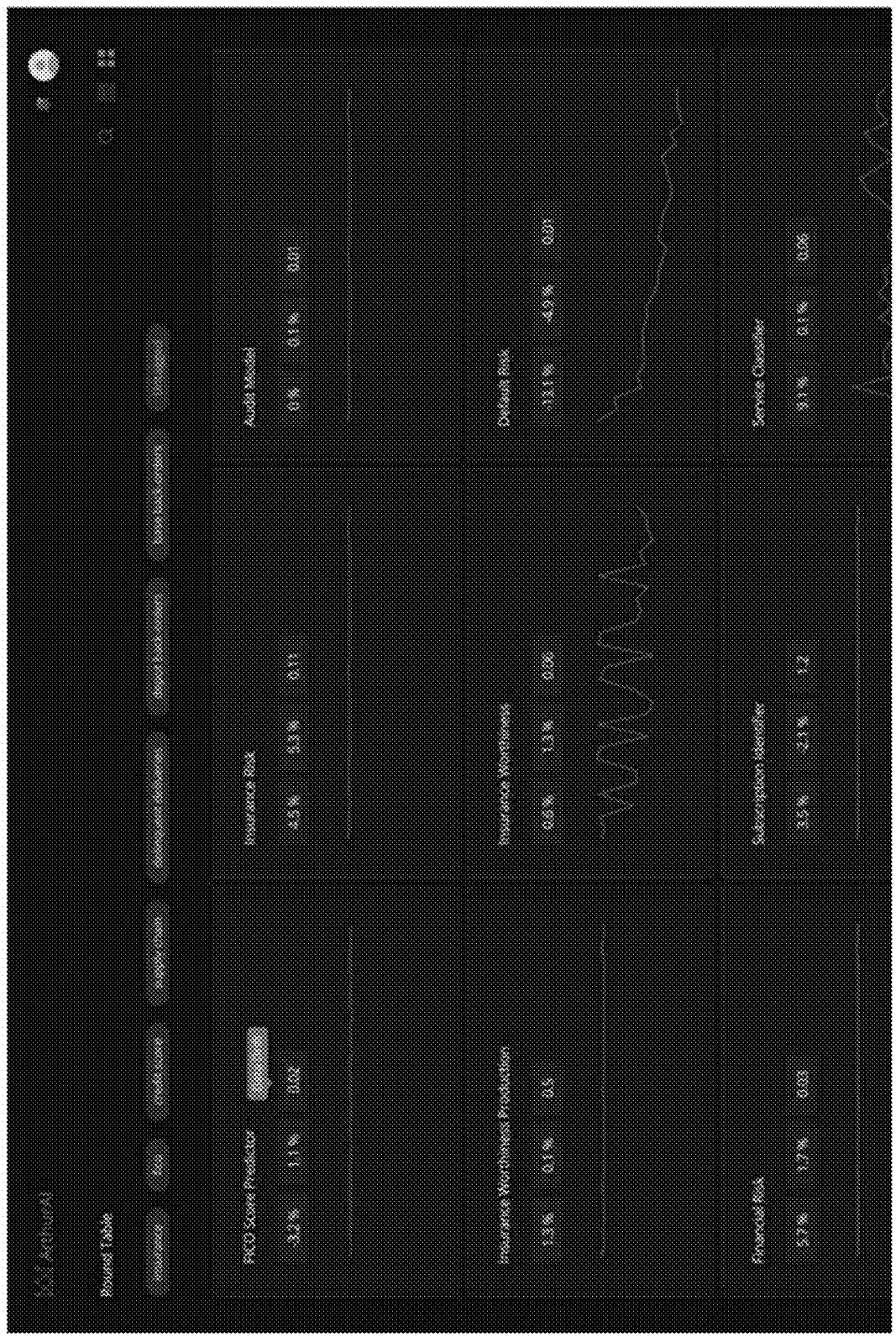
Figure 8C:
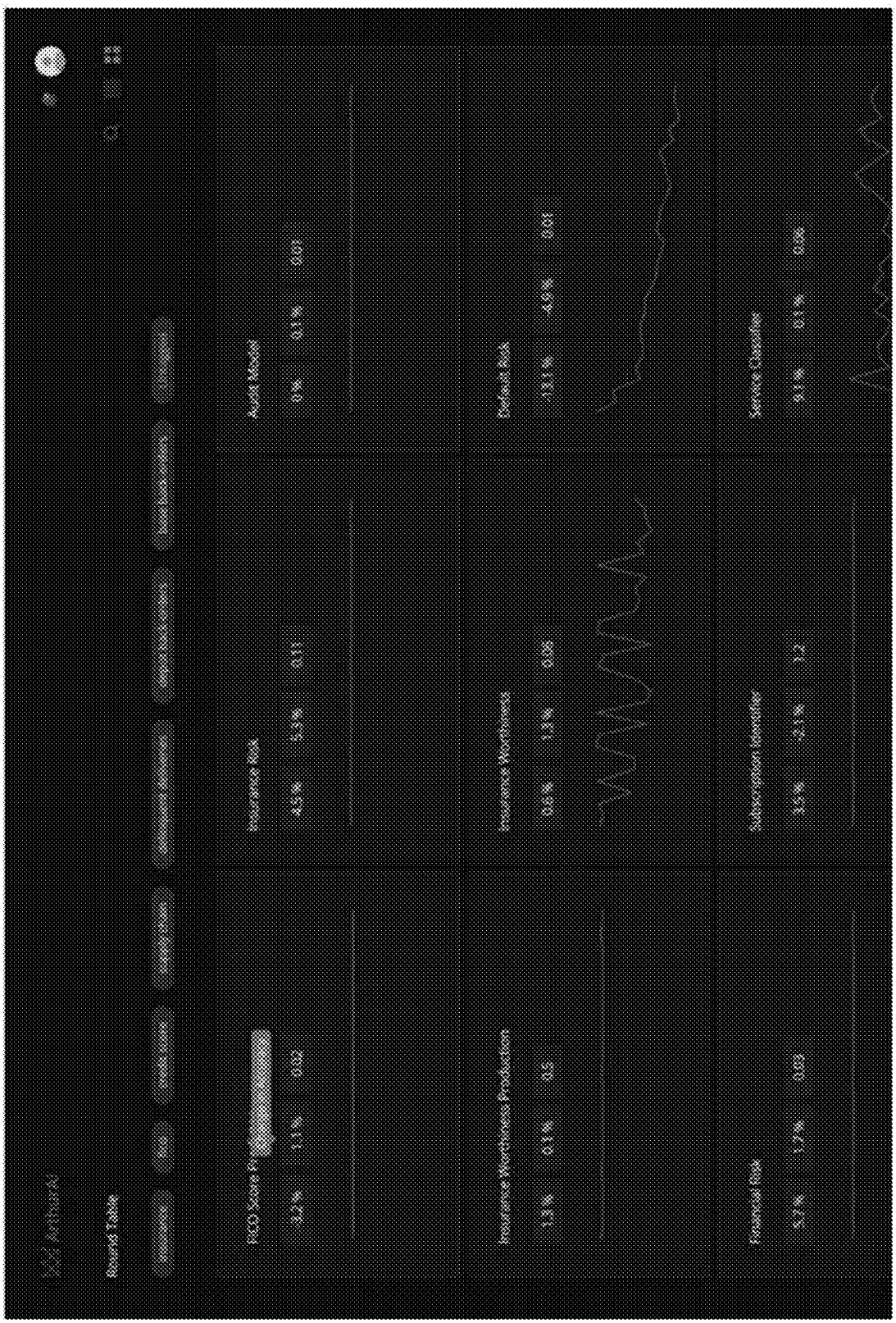
Figure 8D:
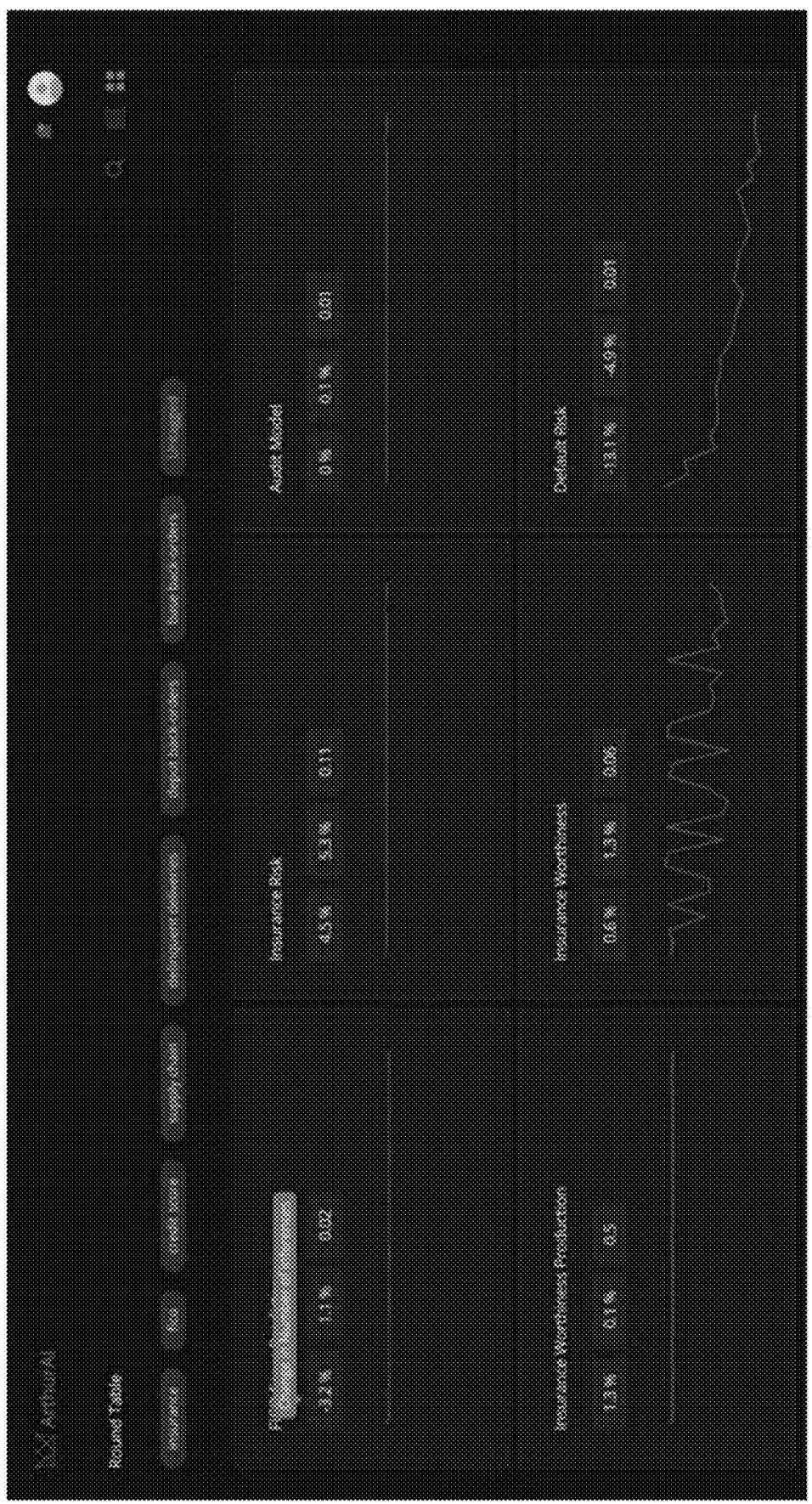
Figure 8E:
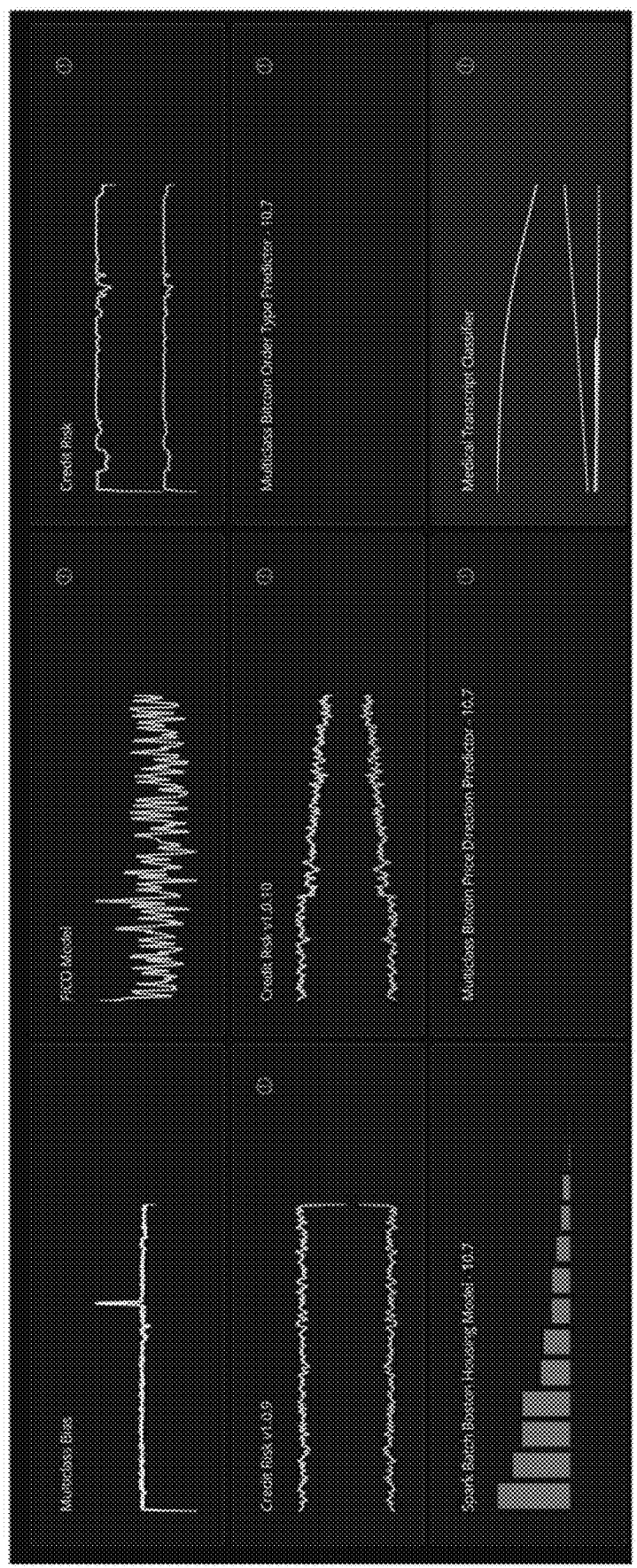

FIGS. 8A-8D are example screenshots of a machine learning monitoring system user interface or "dashboard," according to an embodiment. FIG. 8A shows a first view of the dashboard, with panels for a FICO Score Predictor, Insurance Risk, Audit Model, Insurance Worthiness Production, Insurance Worthiness, and Default Risk. Each panel includes associated time series data, as well as a percentage change in an associated number of inferences (highlighted in FIG. 8D), a percentage change in ML model accuracy (highlighted in FIG. 8C), and a percentage change in an associated data drift (highlighted in FIG. 8B). Each of the percentage change in the number of inferences, the percentage change in ML model accuracy, and the percentage change in data draft can be updated in real time.

Figure 8F:
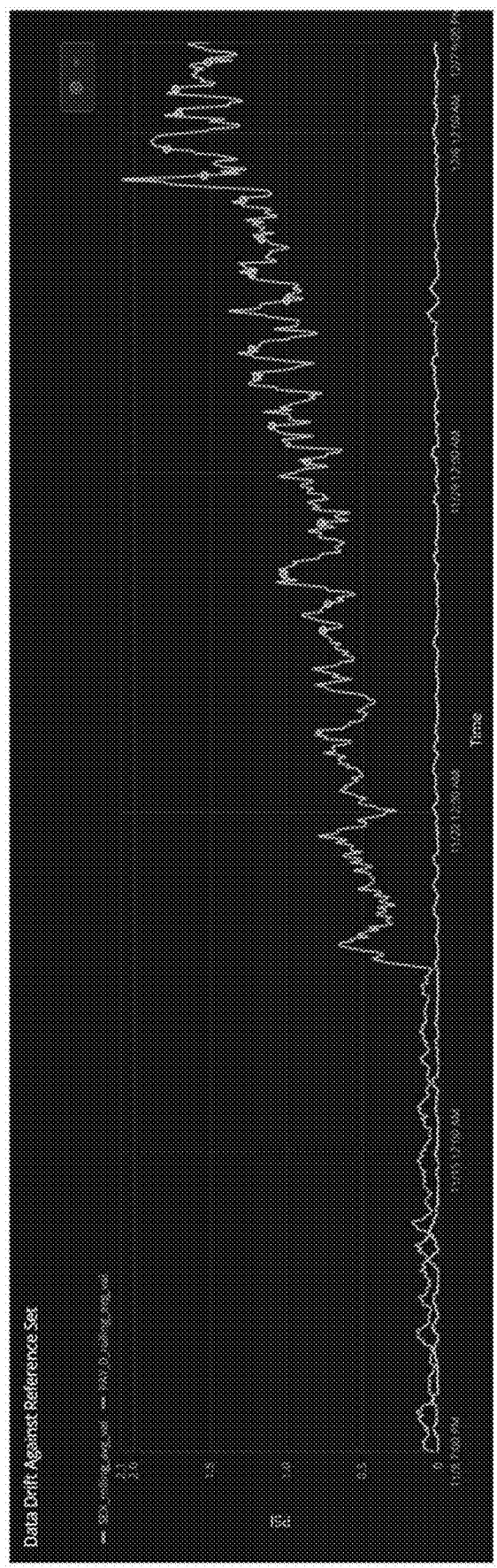
Figure 8G:
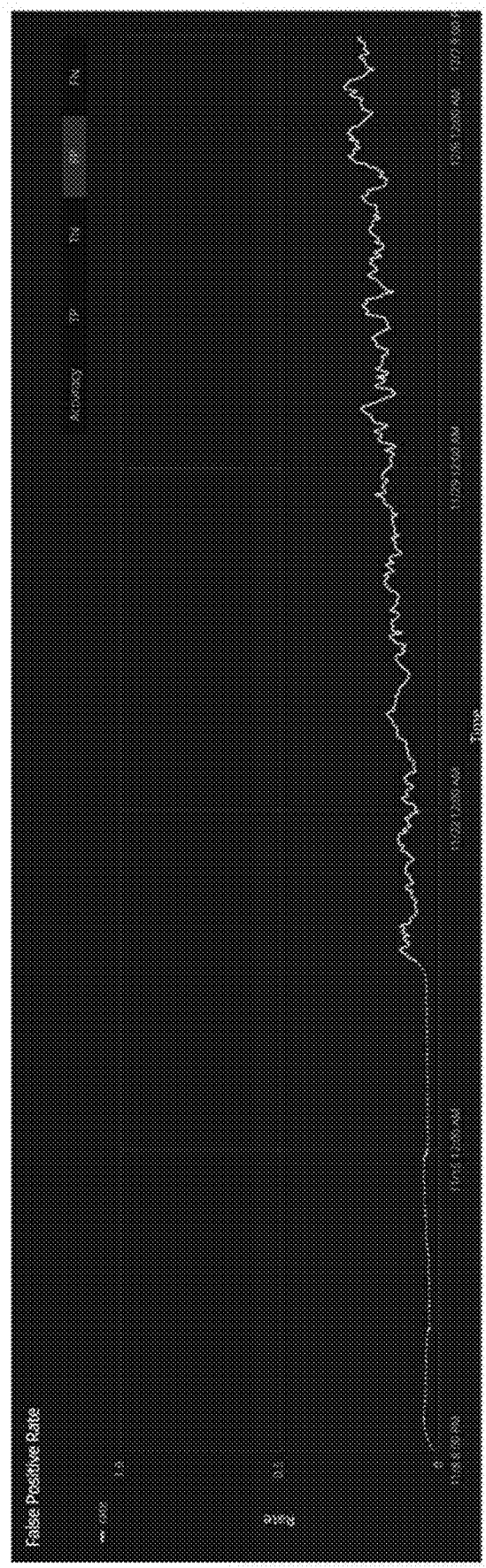
Figure 8H:
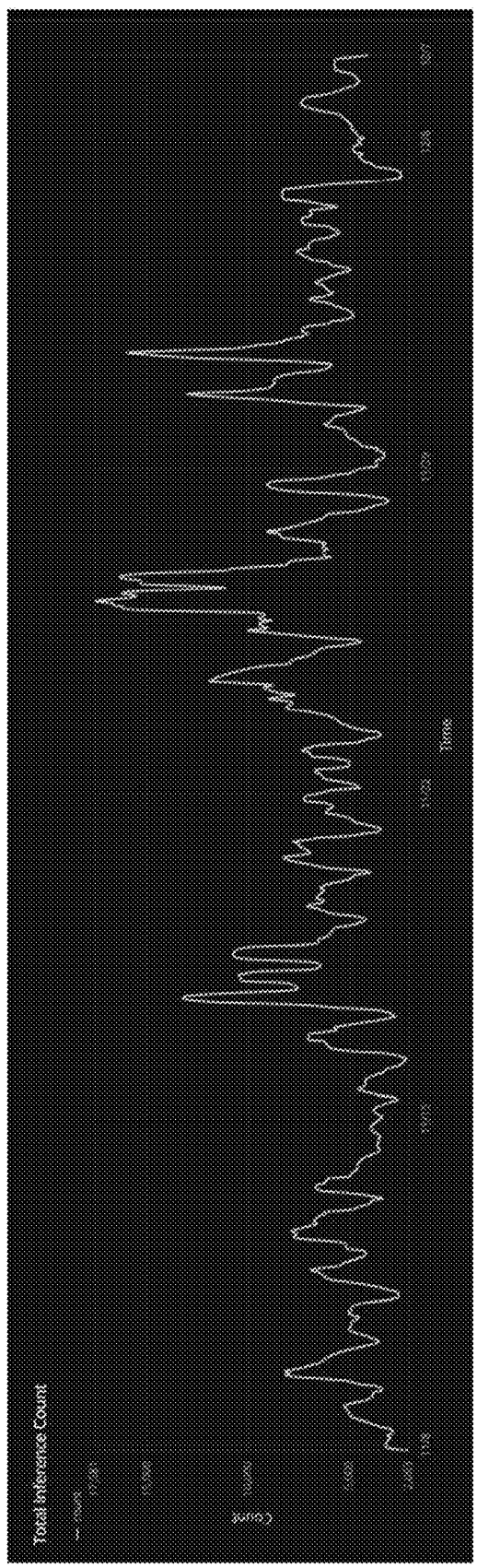

FIGS. 8E-8H are additional example screenshots of a machine learning monitoring system user interface or "dashboard," showing example metrics and ML model data, according to some embodiments. The dashboard of FIG. 8E includes panels for Multiclass Bias, FICO Model, Credit Risk (three different versions), Multiclass Bitcoin Order Type Predictor, Spark Batch Boston Housing Model, Multiclass Bitcoin Price Direction Predictor, and Medical Transcript Classifier. FIG. 8F shows time series data comparing a rolling average value for gender ("SEX"—lower curve), as a reference set, with a rolling average value for pay rate ("PAY"—upper curve). The time series data show data drift in the PAY data. FIG. 8G shows time series data for a false positive count/rate, and FIG. 8H shows time series data for a total inference count.

Figure 9:
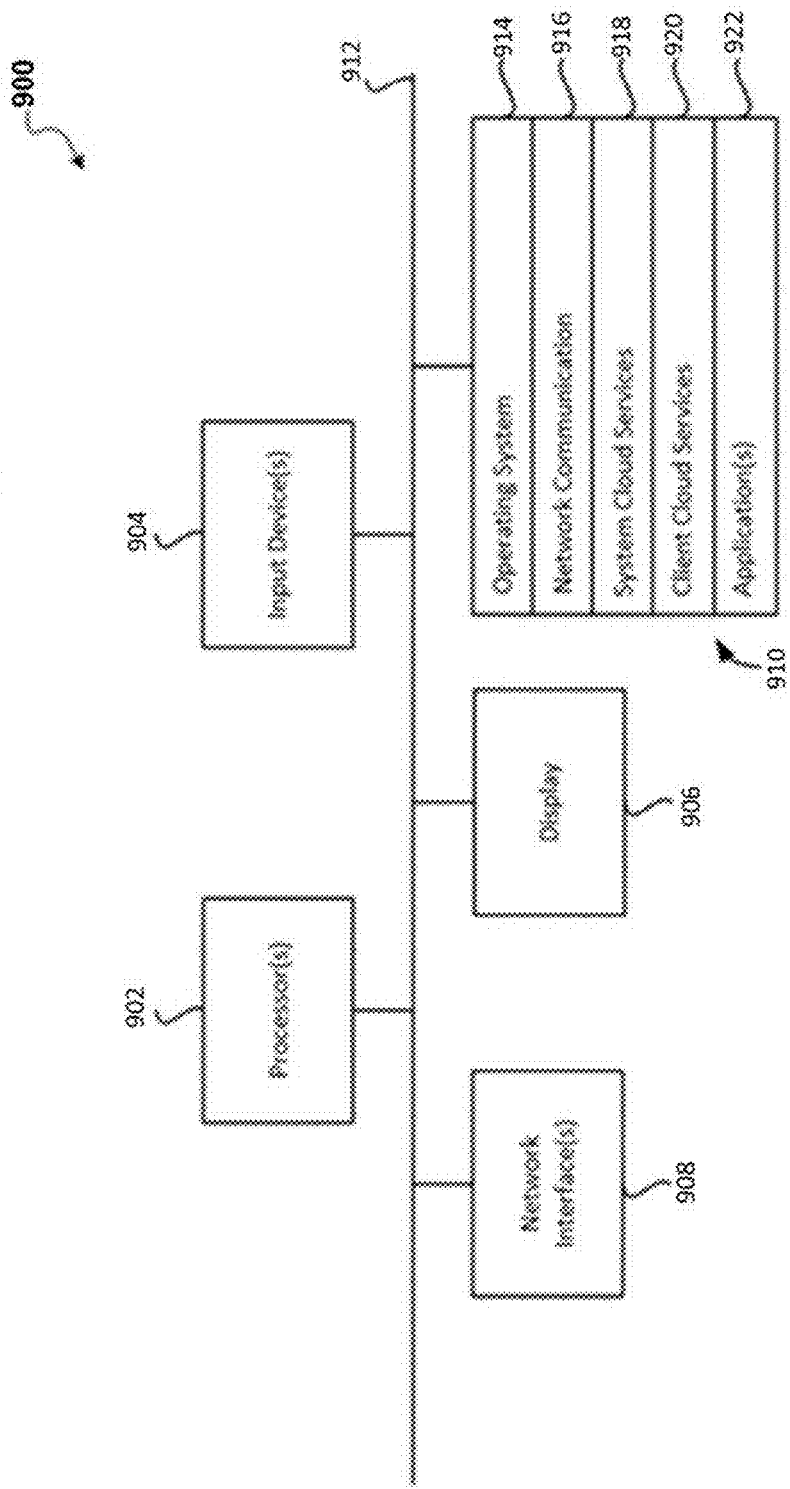
FIG. 9 shows an example computing device, compatible with systems of the present disclosure, in accordance with some embodiments.

FIG. 9 shows an example computing device, compatible with systems of the present disclosure, in accordance with some embodiments. For example, computing device 900 may be configured to perform some or all functions, alone or in combination with other computing devices 900, of the user cloud, non-user cloud (i.e., system cloud), and/or any other functionality described herein. Computing device 900 may be implemented on any electronic device that runs software applications derived from compiled instructions, including without limitation personal computers, servers, smart phones, media players, electronic tablets, game consoles, email devices, etc. In some implementations, computing device 900 may include one or more processors 902, one or more input devices 904, one or more display devices 906, one or more network interfaces 908, and one or more computer-readable mediums 910. Each of these components may be coupled by bus 912, and in some embodiments, these components may be distributed among multiple physical locations and coupled by a network.

Display device 906 may be any known display technology, including but not limited to display devices using Liquid Crystal Display (LCD) or Light Emitting Diode (LED) technology. Processor(s) 902 may use any known processor technology, including but not limited to graphics processors and multi-core processors. Input device 904 may be any known input device technology, including but not limited to a keyboard (including a virtual keyboard), mouse, track ball, and touch-sensitive pad or display. Bus 912 may be any known internal or external bus technology, including but not limited to ISA, EISA, PCI, PCI Express, NuBus, USB, Serial ATA or FireWire. Computer-readable medium 910 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 910 may include various instructions 914 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 may establish and maintain network connections (e.g., software for implementing communication protocols, such as TCP/IP, HTTP, Ethernet, telephony, etc.).

System cloud service instructions 918 may include instructions that enable computing device 900 to perform system functionality and/or related functionality as described herein. User cloud service instructions 920 may include instructions that enable computing device 900 to perform user-side functionality as described herein. Application(s) 922 may be an application that uses or implements the processes described herein and/or other processes. The processes may also be implemented in operating system 914.

Figure 10:
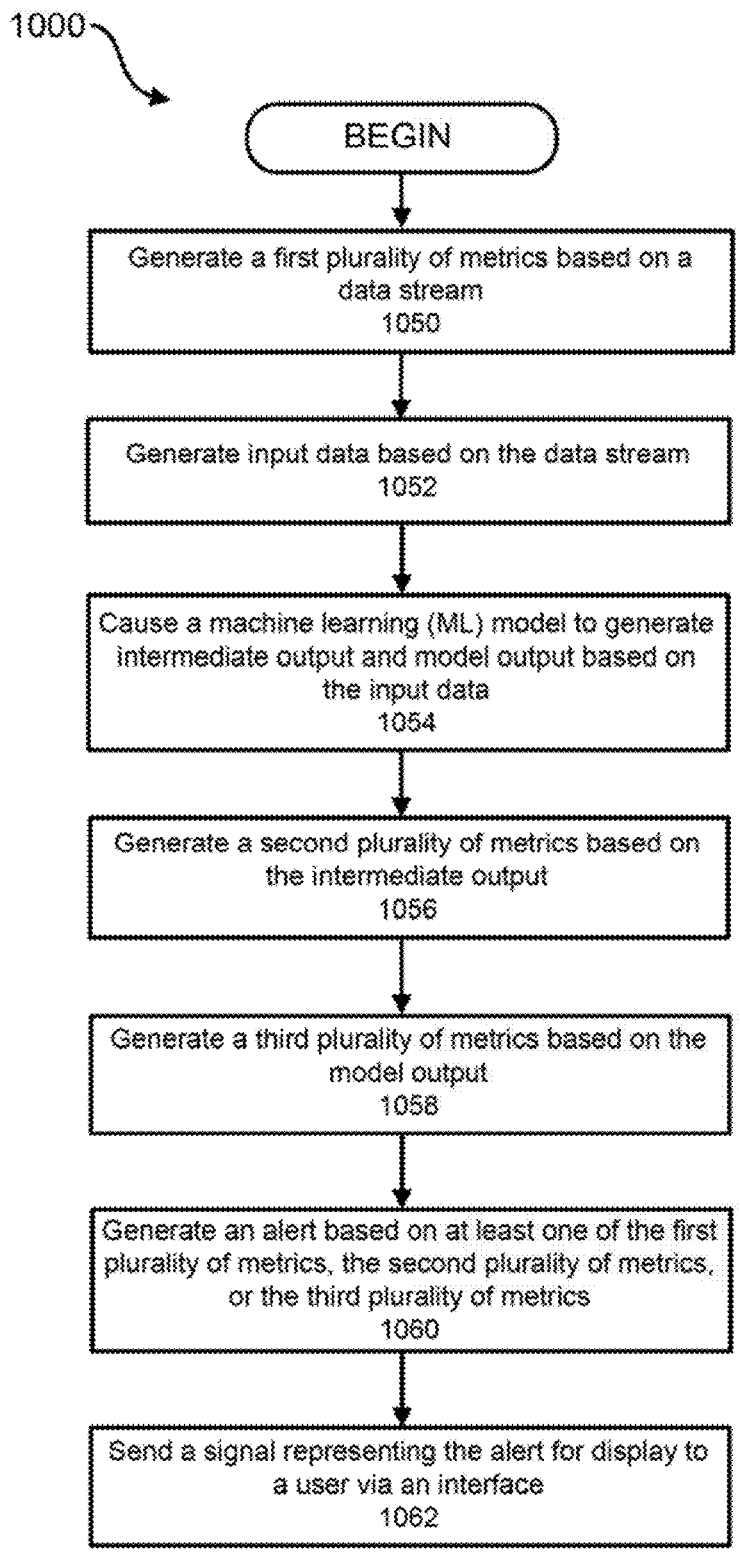
FIG. 10 is a diagram of an example method for machine learning monitoring, according to an embodiment.

FIG. 10 is a diagram of an example method 1000 for machine learning health monitoring, according to an embodiment. As shown in FIG. 10, the method 1000 includes generating, at 1050 and via a processor, a first plurality of metrics based on the data stream. At 1052, the processor generates input data based on the data stream. At 1054, the processor causes a machine learning (ML) model to generate intermediate output and model output based on the input data. A second plurality of metrics is generated by the processor at 1056, based on the intermediate output, and a third plurality of metrics is generated by the processor at 1058, based on the model output. An alert is generated at 1060, based on at least one of the first plurality of metrics, the second plurality of metrics, or the third plurality of metrics, and a signal representing the alert is sent at 1062, for display to a user via an interface.

In some embodiments, a method includes receiving, via a processor, data indicative of one or more performance components of a computer system. The data is processed by the processor using at least one machine learning (ML) algorithm, thereby generating one or more ML outputs. The processor determines that at least one of the ML outputs indicates at least one problem with at least one of the performance components, and in response to the determination, performs at least one automatic remedial action to thereby correct the at least one problem.

In some embodiments, the at least one ML algorithm processes the data according to at least one model. In some embodiments, the method also includes training, the at least one model via the processor. In some embodiments, the method also includes retraining, by the processor, the at least one model using the data.

In some embodiments, the at least one automatic remedial action comprises generating an alert. In some embodiments, the at least one automatic remedial action further comprises causing the alert to be displayed to a user. In some embodiments, the at least one automatic remedial action further comprises performing at least one additional action in response to the alert.

In some embodiments, the processing further generates one or more performance metrics related to the one or more performance components. In some embodiments, the method also includes generating, by the processor, a dashboard user interface configured to display at least one of the performance metrics. In some embodiments, the at least one automatic remedial action includes reporting the at least one problem in the dashboard user interface.

In some embodiments, a system includes a processor in communication with a computer system. The processor is configured to receive data indicative of one or more performance components of the computer system, and to process the data using at least one machine learning (ML) algorithm, thereby generating one or more ML outputs. The processor is also configured to determine that at least one of the ML outputs indicates at least one problem with at least one of the performance components, and in response to the determining, perform at least one automatic remedial action to thereby correct the at least one problem.

In some embodiments, the at least one ML algorithm processes the data according to at least one model. In some embodiments, the processor is also configured to train the at least one model. In some embodiments, the processor is also configured to retrain the at least one model using the data.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A method, comprising:
generating, automatically and in near-real-time via a processor, a first plurality of metrics based on a data stream generated by a first machine learning (ML) model, near-real-time referring to real time adjusted for at least computation-related delay;
generating, via the processor, input data based on the data stream generated by the first ML model;
causing a second ML model to generate (1) intra-model output based on the input data, and (2) exactly one model output dataset based on the input data, the second ML model different from the first ML model;
generating, automatically and in near-real-time via the processor, a second plurality of metrics based on the intra-model output;
generating, automatically and in near-real-time via the processor, a third plurality of metrics based on the model output dataset;
generating an alert based on at least one of the first plurality of metrics, the second plurality of metrics, or the third plurality of metrics; and
sending a signal representing the alert, the alert configured to trigger an automatic remediation action including at least one of automatic retraining of the first ML model or automatic retraining of the second ML model.

2. The method of claim 1, wherein the generating the alert is in response to detecting that a metric from the at least one of the first plurality of metrics, the second plurality of metrics, or the third plurality of metrics exceeds a predefined threshold.

3. The method of claim 2, wherein the predefined threshold is a user-defined threshold.

4. The method of claim 1, wherein the first plurality of metrics includes a non-aggregated data metric having at least one of: a minimum data value, a maximum data value, a mean data value, an average data value, or a variance.

5. The method of claim 1, wherein the first plurality of metrics includes a joint metric having at least one of: a data drift, a covariance, a Kolmogorov-Smirnov (K-S) statistic, or an incremental K-S.

6. The method of claim 1, wherein the second plurality of metrics includes a non-aggregated data metric having at least one of: a minimum Local Interpretable Model-Agnostic Explanations (LIME) value, a maximum LIME value, a LIME value variance, or a gradient value.

7. The method of claim 1, wherein the second plurality of metrics includes a joint data metric having at least one of: a rate of change of averages over Local Interpretable Model-Agnostic Explanations (LIME) values, a rate of change of minimums over LIME values, a rate of change of averages over Shapley Additive Explanation ("SHAP") values, a rate of change of minimums over SHAP values, or a representation of portions of the second ML model that are least active.

8. The method of claim 1, wherein the third plurality of metrics includes a non-aggregated data metric having at least one of: a minimum data value, a maximum data value, a mean data value, an average data value, a variance, or a rate of change.

9. The method of claim 1, wherein the third plurality of metrics includes an aggregated data metric having at least one of: a rate of change of averages, or a difference in maximums.

10. The method of claim 1, wherein generating of at least one of the intra-model output or the model output dataset by the second ML model is further based on reference data.

11. A system, comprising:
a processor configured to be in communication, via a telecommunications network, with a computer system; and
a memory storing processor-executable instructions to cause the processor to:
receive a data stream from the computer system via the telecommunications network, the data stream generated by a first machine learning (ML) model;
automatically and in near-real-time generate a first plurality of metrics based on the data stream, near-real-time referring to real time adjusted for at least computation-related delay;
generate input data based on the data stream;
cause a second ML model to generate (1) an intra-model output based on the input data, and (2) exactly one model output dataset based on the input data, the second ML model different from the first ML model;
at least one of:
automatically generate, in near-real-time, a second plurality of metrics based on the intra-model output, or
automatically generate, in near-real-time, a third plurality of metrics based on the model output dataset;
generate an alert based on at least one of the first plurality of metrics, the second plurality of metrics, or the third plurality of metrics; and
send a signal representing the alert, the alert configured to trigger an automatic remediation action including at least one of automatic retraining of the first ML model or automatic retraining of the second ML model.

12. The system of claim 11, wherein the generation of at least one of the intra-model output or the model output dataset by the second ML model is further based on reference data.

13. The system of claim 12, wherein the reference data includes data associated with a protected class of individuals.

14. The system of claim 11, wherein the first plurality of metrics includes at least one of: a minimum data value, a maximum data value, a mean data value, an average data value, a variance, a data drift, a covariance, a Kolmogorov-Smirnov (K-S) statistic, or an incremental K-S.

15. The system of claim 11, wherein the second plurality of metrics includes at least one of: a minimum Local Interpretable Model-Agnostic Explanations (LIME) value, a maximum LIME value, a LIME value variance, a gradient value, a rate of change of averages over LIME values, a rate of change of minimums over LIME values, a rate of change of averages over Shapley Additive Explanation ("SHAP")

values, a rate of change of minimums over SHAP values, or a representation of portions of the second ML model that are least active.

16. The system of claim 11, wherein the third plurality of metrics includes at least one of: a minimum data value, a maximum data value, a mean data value, an average data value, a variance, a rate of change, or a difference in maximums.

17. The system of claim 11, wherein the alert is a first alert and the memory stores processor-executable instructions to cause the processor to generate a plurality of alerts including the first alert and a second alert, the second alert being triggered as a function of the first alert, and the second alert being generated based on a different one of the first plurality of metrics, the second plurality of metrics, or the third plurality of metrics than the first alert.

18. The system of claim 11, wherein the instructions to generate the alert include instructions to generate the alert in response to a combination of a first metric, from one of the first plurality of metrics, the second plurality of metrics, or the third plurality of metrics, and a second metric from a different one of the first plurality of metrics, the second plurality of metrics, or the third plurality of metrics than the first metric.

19. A method, comprising:
generating, via a processor, a first plurality of metrics based on a data stream generated by a first machine learning (ML) model;
generating, via the processor, input data based on the data stream;
causing a second machine learning (ML) model to generate (1) intra-model output based on the input data, and (2) exactly one model output dataset based on the input data;
generating, via the processor, a second plurality of metrics based on the intra-model output;
generating, via the processor, a third plurality of metrics based on the model output dataset;
generating, via the processor, an alert based on at least one of the first plurality of metrics, the second plurality of metrics, or the third plurality of metrics; and
sending, via the processor, a signal representing the alert to trigger an automatic remediation action including at least one of automatic retraining of the first ML model or automatic retraining of the second ML model.

* * * * *